(12) United States Patent
Minnis et al.

(10) Patent No.: US 9,633,367 B2
(45) Date of Patent: Apr. 25, 2017

(54) SYSTEM FOR CREATING CUSTOMIZED WEB CONTENT BASED ON USER BEHAVIORAL PORTRAITS

(71) Applicant: III HOLDINGS 4, LLC, Wilmington, DE (US)

(72) Inventors: William Charles Minnis, Austin, TX (US); Mark Nagaitis, Austin, TX (US); Trevor Pokorney, Cedar Park, TX (US); Richard Cowin, Austin, TX (US); Brian Gugliemetti, Austin, TX (US); Steven Miers, Austin, TX (US); Eric Schank, Austin, TX (US)

(73) Assignee: III HOLDINGS 4, LLC, Wilmington, DE (US)

( * ) Notice: Subject to any disclaimer, the term of this patent is extended or adjusted under 35 U.S.C. 154(b) by 606 days.

(21) Appl. No.: 14/158,433

(22) Filed: Jan. 17, 2014

(65) Prior Publication Data

US 2014/0207580 A1 Jul. 24, 2014

Related U.S. Application Data

(63) Continuation of application No. 13/276,485, filed on Oct. 19, 2011, now Pat. No. 8,666,835, which is a
(Continued)

(51) Int. Cl.
*G06Q 30/00* (2012.01)
*G06Q 30/02* (2012.01)
(Continued)

(52) U.S. Cl.
CPC ..... *G06Q 30/0244* (2013.01); *G06F 17/2247* (2013.01); *G06F 17/30867* (2013.01);
(Continued)

(58) Field of Classification Search
CPC .......................................... G06Q 30/06–30/08
(Continued)

(56) References Cited

U.S. PATENT DOCUMENTS

| 6,018,738 A | 1/2000 | Breese et al. |
| 6,055,573 A | 4/2000 | Gardenswartz et al. |

(Continued)

OTHER PUBLICATIONS

"Coremetrics & ForeSee Results Forge Strategic Partnership to Integrate Attitudinal & Behavioral Data for Deeper Customer Insight; Businesses Now Able to Combine Data About Customer Satisfaction With Online Behavioral Analysis to Accurately Measure the Impact of Customer Satisfaction on Future Intentions" PR Newswire, Sep. 22, 2003. Retrieved from [http://www.thefreelibrary.com/_/print/PrintArticle.aspx?id=107993586] on May 4, 2015. 3 pages.
(Continued)

*Primary Examiner* — Ethan D Civan
(74) *Attorney, Agent, or Firm* — Amin, Turocy & Watson, LLP

(57) ABSTRACT

A method is provided for determining a website user behavioral portrait based on navigation on the website and dynamically reconfiguring web pages based on those portraits. In accordance with the method, data relating to the progress of a user through a website is recorded, and an ongoing behavioral portrait of the user is built based on the data. The portrait is then used to dynamically reconfigure web content.

30 Claims, 42 Drawing Sheets

Related U.S. Application Data continuation of application No. 12/012,522, filed on Jan. 31, 2008, now Pat. No. 8,719,105.

(60) Provisional application No. 60/898,807, filed on Feb. 1, 2007.

(51) Int. Cl.
  *G06F 17/30* (2006.01)
  *G06Q 30/06* (2012.01)
  *G06F 17/22* (2006.01)
  *H04L 29/08* (2006.01)

(52) U.S. Cl.
  CPC ......... *G06Q 30/02* (2013.01); *G06Q 30/0201* (2013.01); *G06Q 30/0255* (2013.01); *G06Q 30/0269* (2013.01); *G06Q 30/0641* (2013.01); *H04L 67/22* (2013.01)

(58) Field of Classification Search
  USPC .............................................. 705/26.1–27.2
  See application file for complete search history.

(56) References Cited

U.S. PATENT DOCUMENTS

| | | | |
|---|---|---|---|
| 6,134,548 A | 10/2000 | Gottsman et al. | |
| 6,144,962 A | 11/2000 | Weinberg et al. | |
| 6,195,651 B1 | 2/2001 | Handel et al. | |
| 6,195,696 B1 | 2/2001 | Baber et al. | |
| 6,389,469 B1 | 5/2002 | Vekslar et al. | |
| 6,442,577 B1 | 8/2002 | Britton et al. | |
| 6,446,076 B1 | 9/2002 | Burkey et al. | |
| 6,466,970 B1 | 10/2002 | Lee et al. | |
| 6,480,844 B1 | 11/2002 | Cortes et al. | |
| 6,564,259 B1 | 5/2003 | Baber et al. | |
| 6,564,260 B1 | 5/2003 | Baber et al. | |
| 6,629,843 B1 | 10/2003 | Bunting et al. | |
| 6,721,748 B1 | 4/2004 | Knight et al. | |
| 6,804,675 B1 | 10/2004 | Knight et al. | |
| 6,895,387 B1 | 5/2005 | Roberts et al. | |
| 6,917,902 B2 | 7/2005 | Alexander | |
| 6,944,585 B1 | 9/2005 | Pawson | |
| 6,959,319 B1 | 10/2005 | Huang et al. | |
| 6,971,973 B2 | 12/2005 | Cohen et al. | |
| 6,993,557 B1 | 1/2006 | Yen | |
| 6,996,536 B1 * | 2/2006 | Cofino ................... | G06Q 30/06 705/26.8 |
| 7,010,492 B1 | 3/2006 | Bassett et al. | |
| 7,076,504 B1 | 7/2006 | Handel et al. | |
| 7,076,534 B1 | 7/2006 | Cleron et al. | |
| 7,107,269 B2 | 9/2006 | Arlein et al. | |
| 7,110,988 B1 | 9/2006 | Allemann et al. | |
| 7,155,672 B1 | 12/2006 | Adler et al. | |
| 7,203,909 B1 | 4/2007 | Horvitz et al. | |
| 7,493,321 B2 | 2/2009 | Bartek et al. | |
| 7,580,930 B2 | 8/2009 | Brave et al. | |
| 7,596,506 B2 | 9/2009 | Shapira et al. | |
| 7,743,047 B2 | 6/2010 | White et al. | |
| 7,809,740 B2 | 10/2010 | Chung | |
| 7,827,004 B2 | 11/2010 | Chang et al. | |
| 8,065,619 B2 | 11/2011 | Agarwal et al. | |
| 2001/0010046 A1 | 7/2001 | Muyres et al. | |
| 2001/0042016 A1 | 11/2001 | Muyres et al. | |
| 2001/0051559 A1 | 12/2001 | Cohen et al. | |
| 2001/0051978 A1 | 12/2001 | Allen et al. | |
| 2001/0054019 A1 | 12/2001 | de Fabrega | |
| 2001/0056405 A1 | 12/2001 | Muyres et al. | |
| 2002/0002483 A1 | 1/2002 | Siegel et al. | |
| 2002/0002488 A1 | 1/2002 | Muyres et al. | |
| 2002/0004744 A1 | 1/2002 | Muyres et al. | |
| 2002/0010769 A1 | 1/2002 | Kippenhan, III et al. | |
| 2002/0029267 A1 | 3/2002 | Sankuratripati et al. | |
| 2002/0045154 A1 | 4/2002 | Wood et al. | |
| 2002/0046105 A1 | 4/2002 | Gardenswartz et al. | |
| 2002/0062245 A1 | 5/2002 | Niu et al. | |
| 2002/0083067 A1 | 6/2002 | Tamayo et al. | |
| 2002/0087679 A1 | 7/2002 | Pulley et al. | |
| 2002/0089532 A1 | 7/2002 | Cohen et al. | |
| 2002/0091736 A1 | 7/2002 | Wall | |
| 2002/0099649 A1 | 7/2002 | Lee et al. | |
| 2002/0099824 A1 | 7/2002 | Bender et al. | |
| 2002/0111852 A1 | 8/2002 | Levine | |
| 2002/0128904 A1 | 9/2002 | Carruthers et al. | |
| 2002/0138331 A1 | 9/2002 | Hosea et al. | |
| 2002/0143933 A1 | 10/2002 | Hind et al. | |
| 2002/0151779 A1 | 10/2002 | Avrin et al. | |
| 2002/0161779 A1 | 10/2002 | Brierley et al. | |
| 2002/0178166 A1 | 11/2002 | Hsia | |
| 2002/0178257 A1 | 11/2002 | Cerrato | |
| 2002/0184111 A1 | 12/2002 | Swanson | |
| 2003/0023715 A1 | 1/2003 | Reiner et al. | |
| 2003/0063129 A1 | 4/2003 | Smyth | |
| 2003/0108850 A1 | 6/2003 | Murgia et al. | |
| 2003/0110255 A1 | 6/2003 | Tarquini et al. | |
| 2003/0115318 A1 | 6/2003 | Wueste | |
| 2003/0117434 A1 | 6/2003 | Hugh | |
| 2003/0149581 A1 | 8/2003 | Chaudhri et al. | |
| 2003/0154237 A1 | 8/2003 | Mah et al. | |
| 2003/0167153 A1 | 9/2003 | Alexander | |
| 2003/0171977 A1 | 9/2003 | Singh et al. | |
| 2003/0216929 A1 | 11/2003 | Brockway et al. | |
| 2004/0030531 A1 | 2/2004 | Miller et al. | |
| 2004/0031058 A1 | 2/2004 | Reisman | |
| 2004/0064351 A1 | 4/2004 | Mikurak | |
| 2004/0093261 A1 | 5/2004 | Jain et al. | |
| 2004/0093394 A1 | 5/2004 | Weber et al. | |
| 2004/0117239 A1 | 6/2004 | Mittal et al. | |
| 2004/0128618 A1 | 7/2004 | Datta | |
| 2004/0153368 A1 | 8/2004 | Freishtat et al. | |
| 2004/0163101 A1 | 8/2004 | Swix et al. | |
| 2004/0205157 A1 | 10/2004 | Bibelnicks et al. | |
| 2004/0249650 A1 | 12/2004 | Freedman et al. | |
| 2004/0249700 A1 | 12/2004 | Gross | |
| 2005/0015376 A1 | 1/2005 | Fraser et al. | |
| 2005/0027593 A1 | 2/2005 | Wilson | |
| 2005/0033712 A1 | 2/2005 | D'Ambrosio | |
| 2005/0038708 A1 | 2/2005 | Wu | |
| 2005/0044008 A1 | 2/2005 | Freishtat et al. | |
| 2005/0044101 A1 | 2/2005 | Prasad et al. | |
| 2005/0091156 A1 | 4/2005 | Hailwood et al. | |
| 2005/0097008 A1 | 5/2005 | Ehring et al. | |
| 2005/0102292 A1 | 5/2005 | Tamayo et al. | |
| 2005/0125290 A1 | 6/2005 | Beyda et al. | |
| 2005/0132402 A1 | 6/2005 | Gray et al. | |
| 2005/0132419 A1 | 6/2005 | Gray et al. | |
| 2005/0165643 A1 | 7/2005 | Wilson et al. | |
| 2005/0166233 A1 | 7/2005 | Beyda et al. | |
| 2005/0203881 A1 | 9/2005 | Sakamoto et al. | |
| 2005/0204276 A1 | 9/2005 | Hosea et al. | |
| 2005/0216572 A1 | 9/2005 | Tso et al. | |
| 2005/0240558 A1 | 10/2005 | Gil et al. | |
| 2005/0288954 A1 * | 12/2005 | McCarthy ............ | A61B 5/6815 705/2 |
| 2006/0015390 A1 | 1/2006 | Rijsinghani et al. | |
| 2006/0036400 A1 | 2/2006 | Kasriel et al. | |
| 2006/0041548 A1 | 2/2006 | Parsons et al. | |
| 2006/0047563 A1 | 3/2006 | Wardell | |
| 2006/0064411 A1 | 3/2006 | Gross et al. | |
| 2006/0070117 A1 | 3/2006 | Spalink et al. | |
| 2006/0075456 A1 | 4/2006 | Gray et al. | |
| 2006/0155764 A1 | 7/2006 | Tao | |
| 2006/0173838 A1 | 8/2006 | Garg et al. | |
| 2006/0190435 A1 | 8/2006 | Heidloff et al. | |
| 2006/0195328 A1 | 8/2006 | Abraham et al. | |
| 2006/0253884 A1 | 11/2006 | Gray et al. | |
| 2006/0293921 A1 | 12/2006 | McCarthy et al. | |
| 2007/0011039 A1 | 1/2007 | Oddo | |
| 2007/0011224 A1 | 1/2007 | Mena | |
| 2007/0055937 A1 | 3/2007 | Cancel et al. | |
| 2007/0061190 A1 | 3/2007 | Wardell | |
| 2007/0061334 A1 | 3/2007 | Ramer et al. | |
| 2007/0078849 A1 | 4/2007 | Slothouber | |
| 2007/0088821 A1 | 4/2007 | Sankuratripati et al. | |

(56) References Cited

U.S. PATENT DOCUMENTS

| | | |
|---|---|---|
| 2007/0094208 A1 | 4/2007 | Cerrato |
| 2007/0100796 A1 | 5/2007 | Wang |
| 2007/0118396 A1 | 5/2007 | Matz et al. |
| 2007/0169148 A1 | 7/2007 | Oddo et al. |
| 2007/0208728 A1 | 9/2007 | Zhang et al. |
| 2007/0260624 A1 | 11/2007 | Chung et al. |
| 2008/0004884 A1 | 1/2008 | Flake et al. |
| 2008/0005313 A1 | 1/2008 | Flake et al. |
| 2008/0028066 A1 | 1/2008 | Berkhin et al. |
| 2008/0028067 A1 | 1/2008 | Berkhin et al. |
| 2008/0077478 A1 | 3/2008 | Kim |
| 2008/0086524 A1 | 4/2008 | Afergan et al. |
| 2008/0092058 A1 | 4/2008 | Afergan et al. |
| 2008/0098220 A1 | 4/2008 | Spalink et al. |
| 2008/0147659 A1 | 6/2008 | Chen et al. |
| 2008/0154707 A1 | 6/2008 | Mittal et al. |
| 2008/0162206 A1 | 7/2008 | Mak et al. |
| 2008/0162268 A1 | 7/2008 | Gilbert |
| 2008/0162269 A1 | 7/2008 | Gilbert |
| 2008/0162574 A1 | 7/2008 | Gilbert |
| 2008/0172422 A1 | 7/2008 | Li et al. |
| 2008/0183717 A1 | 7/2008 | Singh et al. |
| 2008/0183718 A1 | 7/2008 | Singh et al. |
| 2008/0183745 A1 | 7/2008 | Cancel et al. |
| 2008/0183796 A1 | 7/2008 | Singh et al. |
| 2008/0183867 A1 | 7/2008 | Singh et al. |
| 2008/0183868 A1 | 7/2008 | Singh et al. |
| 2008/0183869 A1 | 7/2008 | Singh et al. |
| 2008/0183870 A1 | 7/2008 | Singh et al. |
| 2008/0184129 A1 | 7/2008 | Cancel et al. |
| 2008/0189254 A1 | 8/2008 | Cancel et al. |
| 2008/0189281 A1 | 8/2008 | Cancel et al. |
| 2008/0189408 A1 | 8/2008 | Cancel et al. |
| 2008/0199042 A1 | 8/2008 | Smith |
| 2008/0214153 A1 | 9/2008 | Ramer et al. |
| 2008/0214157 A1 | 9/2008 | Ramer et al. |
| 2008/0228868 A1 | 9/2008 | Sivakoff |
| 2008/0242279 A1 | 10/2008 | Ramer et al. |
| 2009/0222329 A1 | 9/2009 | Ramer et al. |
| 2009/0234711 A1 | 9/2009 | Ramer et al. |
| 2009/0240568 A1 | 9/2009 | Ramer et al. |
| 2009/0240569 A1 | 9/2009 | Ramer et al. |
| 2009/0240586 A1 | 9/2009 | Ramer et al. |
| 2009/0247193 A1 | 10/2009 | Kalavade |
| 2009/0276523 A1 | 11/2009 | Prasad et al. |
| 2010/0076818 A1 | 3/2010 | Peterson et al. |

OTHER PUBLICATIONS

Office Action dated Feb. 9, 2015 for U.S. Appl. No. 12/012,529, 32 pages.
Berendt, et al., "Analysis of navigation behaviour in web sites integrating multiple information systems". The VLDB Journal, Springer-Verlag, Mar. 2000, vol. 9, Issue 1. Retrieved on Apr. 13, 2015, 20 pages.
International Search Report mailed Jun. 25, 2008 for PCT Application Serial No. PCT/US2008/001477, 3 pages.
Examination Report dated Feb. 16, 2011 for GB Application Serial No. GB0912106.2, 2 pages.
Examination Report dated Sep. 6, 2011 for GB Application Serial No. GB0912106.2, 2 pages.
Examination Report dated Dec. 6, 2011 for GB Application Serial No. GB0912106.2, 4 pages.
Rho, Tobias et al., "Towards Context-Sensitive Service Aspects"; Dept. of Computer Science III, Univ. of Bonn, Apr. 15, 2006; 11 pages.
Hina, M. D. et al., "A Ubiquitous Context-Sensitive Multimodal Multimedia Computing System and Its Machine Learning-based Reconfiguration at the Architectural Level"; Seventh IEEE Intl. Symp. on Multimedia; Abstract only; http://csdl2.computer.org/persagen/DLAbsToc.jsp; Oct. 9, 2006; 4 pages.
Yu, Chang; "Behavioral Marketing 101:Defining the Terminology"; ClickZ Experts; Advice & Opinions, By & For Marketers; www.clickz.com; Oct. 10, 2006; 3 pages.
Rittenhouse, David; "Behavioral Potential for Digitally Minded Direct Marketers"; ClickZ Experts; Advice & Opinions. By & For Marketers; www.clickz.com; Oct. 10, 2006; 5 pages.
Chuang, Siu-Nam et al.; "Dynamic Service Reconfiguration for Wireless Web Access"; Dept. of Comp.; The Hong Kong Polytechnic University; Hung Hom, Kowloon, Hong Kong, SAR, China; May 20-24, 2003, Budapest, Hungary; 25 pages.
Hieggelke, Brent; "Hot Strategy: On-Site BT"; iMediaconnection; Behavioral Marketing: www.imediaconnection.com; Oct. 10, 2006; 3 pages.
Bryan, Nancy W.; "Interpreting the Art of Behavioral Marketing"; iMediaconnection; Behavioral Marketing; www.imediaconnection.com; Oct. 10, 2006; 6 pages.
Porres, Eric; "Making the Goal of Laser-like Targeting"; iMediaconnection; Behavioral Marketing; www.imediaconnection.com; Oct. 10, 2006; 6 pages.
Everling, Larry; "Moving Up the Food Chain"; iMediaconnection; Behavioral Marketing; www.imediaconnection.com; Oct. 10, 2006; 4 pages.
Meskauskas, Jim; "On Target with Targeting"; iMediaconnection; Behavioral Marketing; www.imeadiaconnection.com; Oct. 10, 2006 6 pages.
Kobrin, Sandy; "Sharpen the Arrow With Behavioral Data"; iMediaconnection; Behavioral Marketing; www.imediaconnection.com; Oct. 10, 2006; 6 pages.
Moskowitz, Robert; "Targeting Technology Steps Forward"; iMediaconnection; Behavioral Marketing; www.imediaconnection.com; Oct. 10, 2006; 5 pages.
Zucker, B.; "Targeting: Where's the Action? It's in the Data"; iMediaconnection; Behavioral Marketing; www.imediaconnection.com; Oct. 10, 2006; 5 pages.
Graham, Rob; "The Evolution of Behavioral Targeting, Introduction"; iMediaconnection; infOcus; www.imediaconnection.com; Oct. 10, 2006; 3 pages.
Graham, Rob; "The Evolution of Behavioral Targeting, Understanding BT Benefits"; iMediaconnection; infOcus; www.imediaconnection.com; Oct. 10, 2006; 3 pages.
Graham, Rob; "The Evolution of Behavioral Targeting, Defining Privacy"; iMediaconnection; infOcus; www.imediaconnection.com; Oct. 10, 2006; 4 pages.
Graham, Rob; "The Evolution of Behavioral Targeting, Giving Consumers More Control"; iMediaconnection; infOcus; www.imediaconnection.com; Oct. 10, 2006; 3 pages.
Graham, Rob; "The Evolution of Behavioral Targeting, Overcoming Consumer Data Obstacles"; iMediaconnection; infOcus; www.imediaconnection.com; Oct. 10, 2006; 3 pages.
Graham, Rob; "The Evolution of Behavioral Targeting, BT's Development"; iMediaconnection; infOcus; www.imediaconnection.com; Oct. 10, 2006; 3 pages.
Graham, Rob; "The Evolution of Behavioral Targeting, Where BT is Heading"; iMediaconnection; infOcus; www.imediaconnection.com; Oct. 10, 2006; 3 pages.
Anfuso, Dawn; "The Science of Targeting"; iMediaconnection; Behavioral Marketing; www.imediaconnection.com; Oct. 10, 2006; 5 pages.
Office Action for U.S. Appl. No. 14/158,028 dated Sep. 22, 2016 for, 54 pages.
Office Action for U.S. Appl. No. 14/158,245 dated Sep. 22, 2016 for, 55 pages.
"The Neonatal Behavioral Assessment Scale: What Is It?" The Brazelton Institute -Children's Hospital Boston; copyright 2005-2013, Children's Hosptal Boston; www.brazelton-institute.com/intro.html; Retrieved on Dec. 4, 2016, 2 pages.
Office Action for U.S. Appl. No. 14/158,028 dated Feb. 1, 2017 for, 26 pages.
Office Action for U.S. Appl. No. 14/824,069 dated Feb. 1, 2017 for, 52 pages.

\* cited by examiner

SYSTEM FOR CREATING CUSTOMIZED WEB CONTENT BASED ON USER BEHAVIORAL PORTRAITS

CROSS-REFERENCE TO RELATED APPLICATION

This application is a Continuation of U.S. application Ser. No. 13/276,485, filed on Oct. 19, 2011, now issued as U.S. Pat. No. 8,666,835, which is incorporated herein by reference in its entirety, which is a Continuation of U.S. application Ser. No. 12/012,522, filed Jan. 31, 2008, now issued as U.S. Pat. No. 8,719,105, which claims the benefit of priority from U.S. Provisional Application No. 60/898,807, filed Feb. 1, 2007, having the same inventors, and which is incorporated herein by reference in its entirety.

FIELD OF THE DISCLOSURE

The present disclosure relates generally to methods for customizing web page content, and more specifically, to methods for generating user behavioral portraits based on web site navigation and search behavior, and for dynamically reconfiguring web page content based on such portraits to produce personalized web page content.

BACKGROUND OF THE DISCLOSURE

As e-commerce has evolved into a widespread means of doing business, online competition among merchants has increased dramatically. Much of the attention in online marketing has been directed towards placing advertisements for products or services as close to a spending decision as possible, since this is often a significant factor in an online merchant's likelihood of success.

As a specific example, a car rental company might design their website so that it is likely to turn up as a relevant hit when a consumer uses a search engine to search the term "car rental". The company might even purchase prioritization from one or more businesses that manage popular search engines such as YAHOO!® or GOOGLE® so that their web site will appear near the top of the search results page whenever terms indicating an interest in car rentals are input into the search engine. In some cases, the company may even go the additional step of purchasing banner ads or pop-ups that are triggered by relevant search queries.

While the foregoing approach may be part of a sound online marketing strategy, it suffers from the drawback that it relies upon an overt manifestation of consumer interest to identify potential purchasers of a product or service. Consequently, such an approach may miss a significant number of sales opportunities, simply because it identifies many potential purchasers of a product or service well after a spending decision has been made. In the interim, the consumer may have been exposed to a wide variety of competing products and services.

Some of the more recent refinements in online marketing have focused on placing products or services even closer to a spending decision by looking for more subtle clues to a consumer's interests. Referring back to the previous example, the car rental company may place advertisements on web sites that help consumers to purchase airline tickets, based on the realization that a significant number of people who are purchasing airline tickets will also require a rental car. However, while this type of approach may also form part of a sound online strategy, it is founded on correlations that may be weak. Hence, this type of approach often yields a low success rate.

Other methods of online marketing have evolved which seek to match advertising content to perspective purchasers based on relevance determined from broad demographic information or consumer purchase history. For example, some websites use pop-up ads and banners whose content is selected based on the gender and age of a consumer provided during web site registration, on information gleaned from previous on-line purchases by the consumer, or on the geographic region indicated, for example, by the user's IP address.

However, methods which rely on data obtained from web site registration are of limited utility, since many consumers are hesitant to spend time on websites completing forms and profiles for what is perceived to be of little benefit. Methods based on broad demographic information frequently have a low success rate, since they are necessarily based on broad generalizations which may not apply to a given consumer. Methods based on purchase history are prone to error, since simple product relationships based on previous purchases can be misleading. Previous purchases may have no bearing on the consumer's personal interests, as may be the case if those purchases represent gifts purchased for others. Moreover, even if the previous purchases were for the consumer's personal enjoyment, those purchases may not represent the consumer's current interests. For example, the fact that a consumer's browsing history or previous purchases indicate a past interest in travel does not mean that the consumer has a current interest in travel. The consumer may have exhausted all of his vacation time, and is now interested in goods and services commensurate with a regular work schedule.

BRIEF DESCRIPTION OF THE DRAWINGS

In the following figures, like reference numerals indicate like elements.

SUMMARY OF THE DISCLOSURE

Figure 1:
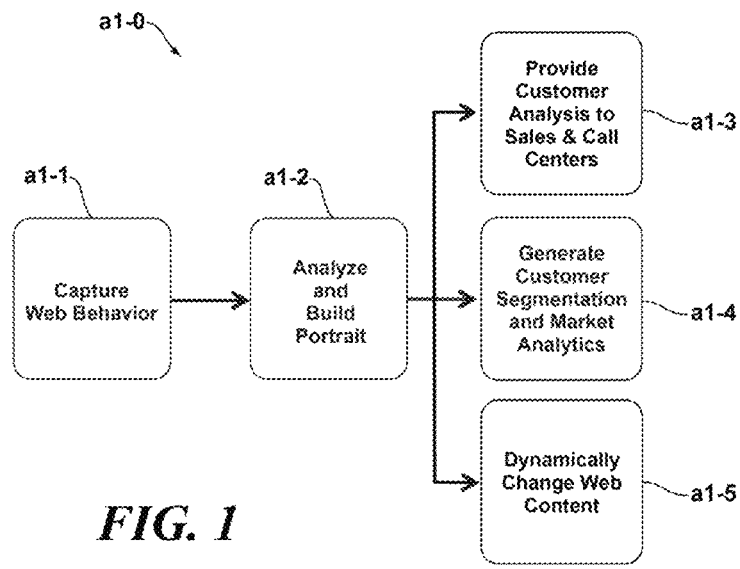
FIG. 1 is a flowchart illustrating some of the general methodologies described herein.

In one aspect, a method for dynamically reconfiguring web pages based on user behavioral portraits is provided which comprises (a) recording data relating to the behavior of a user on a website; (b) building a behavioral portrait of the user based on the data; and (c) dynamically reconfiguring web content based on the behavioral portrait.

In another aspect, a method for developing user behavioral portraits is provided which comprises (a) recording data relating to the behavior of a user on a website; and (b) building a behavioral portrait of the user based on the data.

In another aspect, a method for reconfiguring web pages is provided which comprises (a) providing a behavioral portrait of a user; and (b) dynamically reconfiguring web content based on the behavioral portrait.

In a further aspect, a method for providing customized web pages is provided which comprises (a) receiving a request for a web page from a client associated with a user; (b) modifying the requested web page in light of a behavioral portrait developed for the user; and (c) providing the modified web page to the user in place of the requested web page.

In still another aspect, a system for providing customized web pages is provided which comprises (a) a first server adapted to provide web pages to a client associated with a user and being further adapted to receive input from the user when the user accesses features on the web pages; (b) a software program adapted to (i) receive user input from the first server, (ii) create a behavioral portrait of the user based on the user input, and (iii) dynamically update the behavioral portrait as additional user input becomes available, thereby creating an updated behavioral portrait; and (c) a second server adapted to alter the content of the web pages displayed by said first server based on the updated behavioral portrait.

In yet another aspect, a system for providing customized web pages is provided which comprises (a) a server in communication with a client over a network; and (b) a software program adapted to develop a behavioral portrait of a user associated with the client based on captured data relating to the online behavior of the user.

In still a further aspect, a method for doing business is provided which comprises (a) providing a computing device equipped with a software program adapted to (i) receive user input from a server, (ii) create a behavioral portrait of the user based on the user input, and (iii) utilize the behavioral portrait to modify a web page; (b) utilizing the computing device to produce modified web content; (c) providing the modified web content to a web site provider; and (d) charging the web site provider a fee based on the modified web content displayed on the web site.

In another aspect, a method for doing business is provided which comprises (a) providing a behavioral portrait of a user to a third party entity, the behavioral portrait being based on user input gathered during an online session that the user was involved in; and (b) assessing a first fee to the third party based on the third party's acceptance of the portrait.

In still another aspect, a method for doing business is provided which comprises (a) creating a behavioral portrait of a user based on user input gathered during an online session that the user was involved in; (b) using the behavioral portrait to determine a recommended manner of interacting with the user; and (c) selling to another party a document containing the recommended manner of interacting with the user.

In yet another aspect, a method of analyzing a website is provided which comprises (a) recording data relating to the online behavior of a plurality of users through the website; (b) building a behavioral portrait for each of the plurality of users based on the data; (c) categorizing the behavioral portraits of the plurality of users into a plurality of portrait types; and (d) analyzing the behavior of the plurality of users on the website as a function of portrait type.

In still another aspect, a method for analyzing a web page is provided which comprises (a) categorizing the features appearing on the web page in terms of at least one behavioral trait which selection of the feature would indicate; and (b) creating a graphical overlay which reflects the categorization of the features.

DETAILED DESCRIPTION

A. Overview

One major shortcoming of the above described marketing methods, especially when they are applied in online marketing contexts, is that they focus almost exclusively on identifying potential purchasers of a product or service, rather than focusing on the manner in which the product or service is being presented. Consequently, these approaches fail to apply psychological principles to the identification and accommodation of a consumer's preferred purchase patterns. In the equivalent human-to-human interaction attendant to a sales opportunity, body language, interaction, dialog and physical indicators may all influence the tone, form and content of any given conversation. These cues are critical to the success of any face-to-face sales meeting, and a skilled salesperson will utilize these cues to quickly adapt his approach as necessary to maximize the likelihood of success.

By contrast, such psychological principles have not been applied heretofore to equivalent web-based dialogs. In particular, methods currently utilized for implementing online advertising and selecting web content fail to ascertain the reason and motivation a given online consumer has for closing a sale. These methods ignore the manner in which a given consumer prefers to make decisions, and fail to tailor the presentation of information to a consumer's preferences (e.g., in accordance with how the consumer prefers to have information presented to them).

Continuing the car rental example given above and applying it to visitors to the website of a car rental company, a first visitor to the website may be looking for a vehicle that offers excitement and entertainment for a camping trip. A second visitor may be looking for an image of success and style in a vehicle. A third visitor may be looking for the safest vehicle. In addition, each of these visitors may have their own unique approaches to making a spending decision. For example, one visitor may prefer to make a spending decision based largely on how others rate a particular product offering, while another visitor may prefer to make a spending decision after reviewing a detailed comparison of product performance specifications. A website that fails to promptly recognize each of these diverse motivations, and to present appropriate content in an appropriate manner that is suitably prioritized to reflect the user's preferred approach to making a spending decision, may strike one or more of these users as being not particularly relevant to that user's interests. As a result, the user may navigate to a different, possibly competing web site.

It has now been found that the above noted needs may be met through systems, methods and software of the type described herein which analyze an individual's online behavior so as to derive the individual's behavioral portrait, and which use that behavioral portrait to modify the manner in which information is presented to the individual. In the context of a buying situation, a behavioral portrait is the psychological profile of an individual as it pertains to the individual's preferences in that situation, including their preferred decision-making approach, their motivation for making the purchase, and the manner in which they prefer to have information presented to them.

FIG. 1 provides an overview of some of these systems and methodologies. As seen therein, the starting point for many of these systems and methodologies is the capture a1-1 of the web behavior of one or more individuals. This behavior is then analyzed and is used to develop a behavioral portrait a1-2 of the individual. The resulting behavioral portrait may then be put to a variety of end uses.

In some embodiments, the methodologies described herein, and the systems and software which implement them, apply scientific and psychological principles to improve the way that information is presented to a website user a1-5. These methodologies may be used to emphasize information which is particularly relevant to a user's current needs and state of mind, and to de-emphasize information which, although possibly important, may be ancillary to a particular user's interests or decision making process. Consequently, these methodologies may be utilized to customize websites so that they appear to have been defined for a given user's particular needs at a particular time. As a result, navigation around the website will seem more natural for the user, transaction closure procedures will be appropriately tailored so that they are more appropriate for the situation and the user's current state of mind, and marketing offers on the site will be customized for user behavior as befits the time and context.

Preferably, the behavioral portrait is utilized to dynamically (and possibly automatically) customize, reconfigure or personalize web pages, web content and/or web sites so that the resulting web pages are more conducive to an individual's state of mind. As a result, the individual's experience in navigating a website may be more rewarding. In an e-commerce setting, this may result in a greater number of sales closures, and may have the effect of improving website applicability, sales, and return rates, while also providing specific valuable information which may be utilized to differentiate a given website from competitive offerings. Hence, in some embodiments, the methodologies described herein may be utilized to provide dynamic and personalized web content which is adapted to customer buying behaviors.

In other applications, an individual's behavioral portrait (or information pertaining thereto) may be provided to human salespeople, call centers, marketing teams and the like a1-3 for use in determining how to interact with that individual. These parties may use the behavioral portrait (or information pertaining thereto) to better understand how to communicate with the individual, how to handle objections the individual may have, and how to close a sale with the individual.

In still other applications, analyses may be performed on the manner in which individuals interact with a website or web page as a function of their behavioral portrait a1-4. These analyses may be utilized, for example, to refine a website or web page to make it more attractive to a target set of users, to help a business better understand its customer base and how to interact with that customer base, and to identify problem areas with a website or web page. In particular, these analyses may be utilized to help the owner of a website or a web marketing program to determine how to improve e-commerce closure rates, to understand how to improve visitor return rates, to understand why customers are leaving the website, to increase the effectiveness of web marketing programs and offline programs, and to understand how best to communicate with various customer segments.

Figure 2:
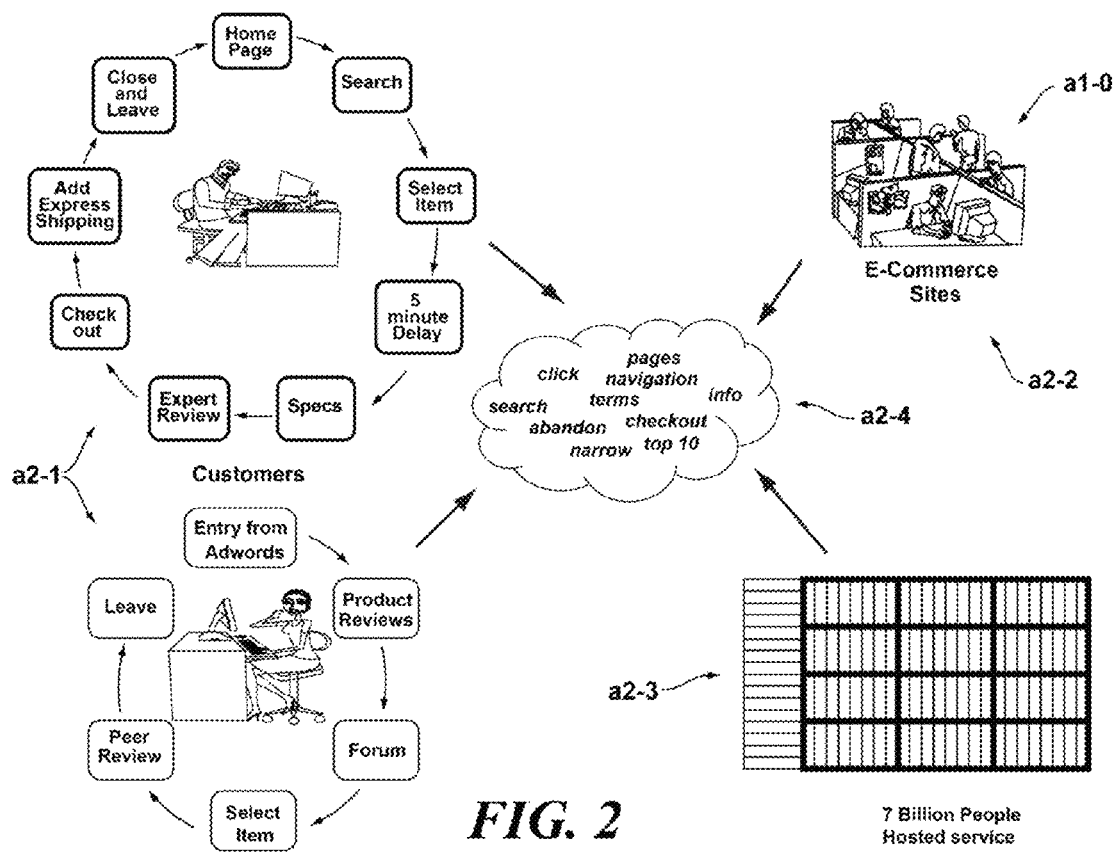
FIG. 2 is an illustration of a network over which behavioral portraits may be gathered in accordance with some of the methodologies described herein.
Figure 3:
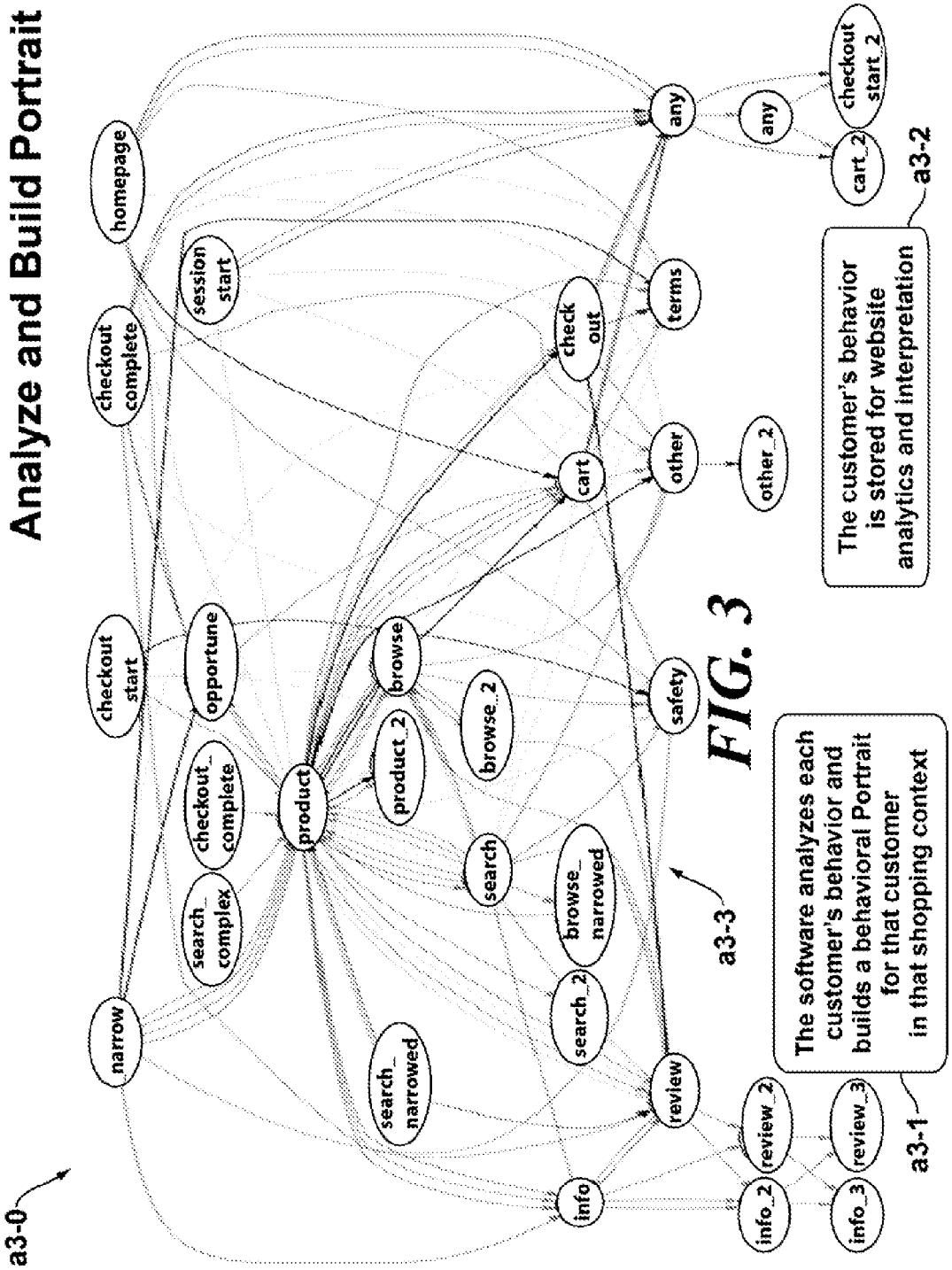
FIG. 3 is an illustration of user actions which may be analyzed in the building of a behavioral portrait in accordance with some of the methodologies described herein.

As seen in FIG. 2, the capture of web behavior may be accomplished through the use of software running on servers a2-3 which remotely and transparently monitor the online behavior of users a2-1 on a web site. The pages on the website (or the templates from which these pages are derived) may be provided with appropriate JavaScript or other suitable web applications which categorize and tag every relevant action that a user can take. These actions may include the pages a user navigates, the items the user clicks on, search terms entered by the user (including the entry of narrowing searches), check out information, pages abandoned by the user, selection of "top 10" items by the user, and other such information. FIG. 3 depicts various actions a visitor may take on a single web page and various paths the visitor may take through a web site. These actions, and the paths taken to get to a given action, may be used to build a psychological behavioral portrait for that visitor.

Figure 4:
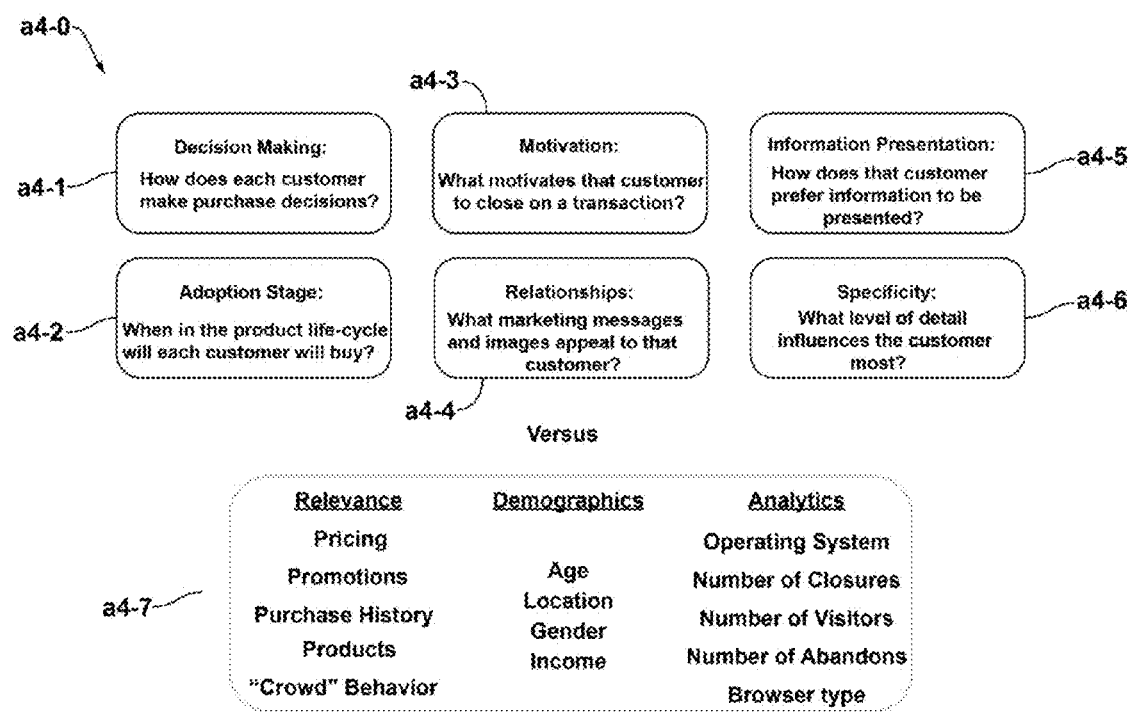
FIG. 4 is an illustration of some of the questions which can be answered with the information provided by some of the systems and methodologies described herein, as compared to the information gleaned by conventional methodologies.

FIG. 4 summarizes some of the information the foregoing methodology provides and contrasts it to the information provided by conventional methods (such as polls) utilized to gather information about consumers. As seen therein, the information a4-7 gathered by conventional techniques typically includes relevance information (information on pricing, promotions, purchase history, products, or typical "crowd" behavior), demographics (including information such as age, location, gender or income), or analytical information (information such as a user's operating system, the number of closures on a website, the number of visitors to the website, the number of browsers who have abandoned the website, and the browser types being utilized to browse the web site). While such information may be useful, it provides very little information about the consumer's personality or state of mind. Hence, while this information may be used to identify potential customers, it provides very little useful information about how and when to interact with the customer.

By contrast, methodologies are possible in accordance with the teachings herein which provide a variety of information very specific to the customer and the customer's current state of mind. This information is very useful in understanding how, and when, to interact with the customer. This includes information on the customer's decision-making process a4-1 (how the customer makes purchase decisions), information on the customer's motivations a4-3 (what motivates that customer to close on a transaction), information on how the customer prefers to have information presented to them a4-5, an indication of when in the product lifecycle the customer is most likely to make a purchase a4-2, the marketing messages and images that are likely to appeal to the customer a4-4, and the level of detail appropriate for the customer a4-6.

The methodologies described herein are especially useful in the context of e-commerce, and hence, frequent reference will be made to the application of these methodologies within this context. However, it will be appreciated that many of the methodologies described herein are broadly applicable to the customization of web content in any context to make it more compatible with the user's behavioral portrait. Thus, unless otherwise indicated, the methodologies and systems described herein should not be construed as being specifically limited to their use in e-commerce settings.

B. Hardware and Network Implementation

Figure 5:
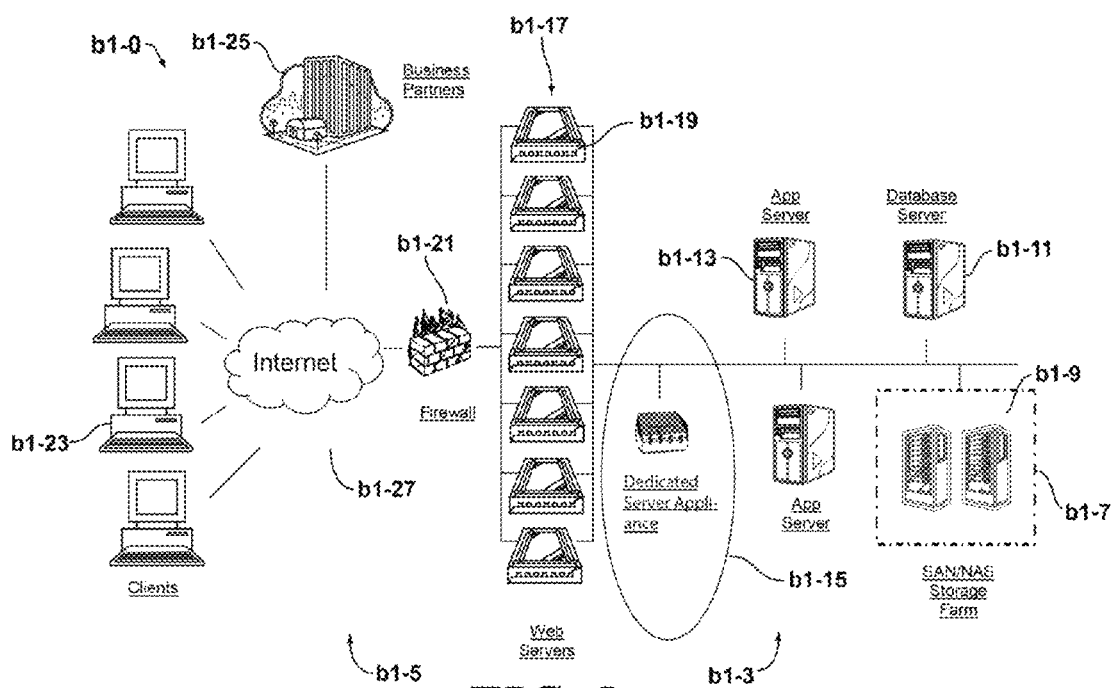
FIG. 5 is an illustration of a particular, non-limiting embodiment of a network equipped with a dedicated server appliance for implementing some of the software and methodologies taught herein.
Figure 6:
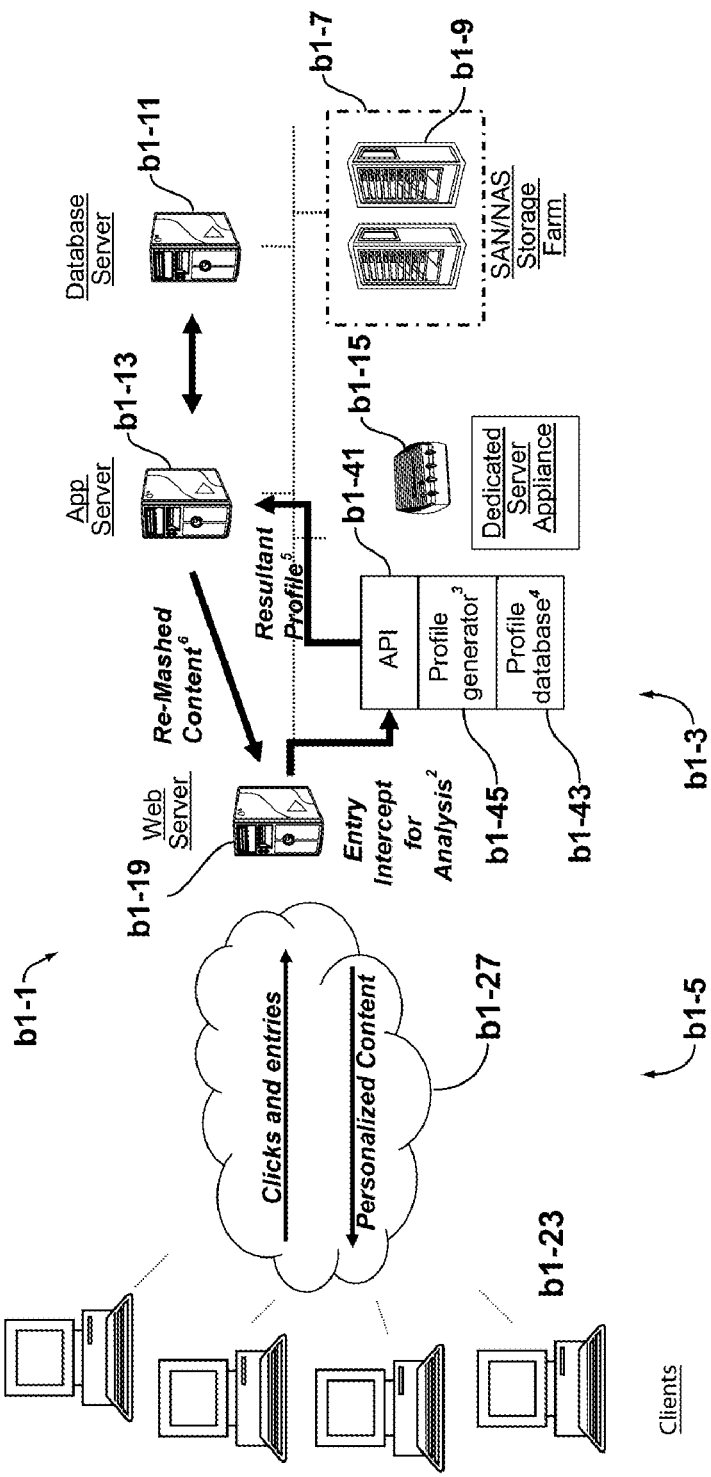
FIG. 6 is an illustration of a particular, non-limiting embodiment of a network equipped with a dedicated server appliance for implementing some of the software and methodologies taught herein.

FIGS. 5 and 6 depict one particular, non-limiting embodiment of a system which may be used to implement some of the software and methodologies disclosed herein. This system essentially consists of a front end and a back end. At the front end of the system, the navigational attributes of a user are captured, and those attributes are utilized to develop a behavioral portrait for the user. At the back end of the system, the behavioral portrait so generated is utilized to dynamically reconfigure web content.

With reference to FIG. 5, the network b1-1 in this particular embodiment has a server side b1-3 and a client side b1-5. The server side b1-3 comprises a SAN/NAS (Storage Area Network/Network Attached Storage) storage farm b1-7 comprising a plurality of storage devices b1-9, a database server b1-11, a variety of application servers b1-13, a dedicated server appliance b1-15 which runs the software for implementing the methodology described herein, a server farm b1-17 which includes a plurality of web servers b1-19, and a firewall b1-21.

The web servers b1-19 communicate with a plurality of client devices b1-23 and with a plurality of business partners b1-25 through the firewall b1-21 and over a suitable WAN (wide area network) b1-27 such as the Internet. The business partners b1-23 will typically be businesses that wish to market goods or services over the WAN b1-27. In some cases, these parties may supply advertising content to the web servers b1-19.

FIG. 6 illustrates how the network b1-1 depicted in FIG. 5 may be utilized to generate user portraits and to dynamically reconfigure web content based on the user portraits. As seen therein, each web server b1-19 receives behavioral information from a user of the WAN b1-27. That behavioral information is typically in the form of context sensitive mouse clicks, keyboard entries, searches, menu selections, verbal commands (in the case, for example, of devices utilizing voice recognition software), and other types of user input.

The dedicated server appliance b1-15 is equipped with an application programming interface (API) b1-41 which enables it to receive and analyze user input from the server b1-19. The API b1-41 further includes a portrait database b1-43 which stores existing user portraits, and a portrait generator b1-45 which generates new user portraits based on the user input. In the event that the user already has a portrait stored in the portrait database b1-43, the portrait generator b1-45 recognizes this fact and modifies the existing user portrait as new information about the user's behavior becomes available. The API b1-41 then forwards the resulting user portrait to an application server b1-13. The application server b1-13 acts upon the user portrait by generating re-mashed web content which is personalized to the user's behavioral portrait, and then passes the re-mashed web content to the web server b1-19 for transmission to the appropriate client device b1-23.

In a preferred mode of operation, the dedicated server appliance b1-15 continuously updates the user portrait database b1-43 in real time as new input from a user becomes available, and promptly passes an updated portrait (or the updated portion thereof) for the user to the application server b1-13. The application server b1-13, in turn, serves up re-mashed content to the user. Hence, the dedicated server appliance b1-15 provides dynamic reconfiguration of web page content, and personalizes subsequent web pages for that user.

Figure 7:
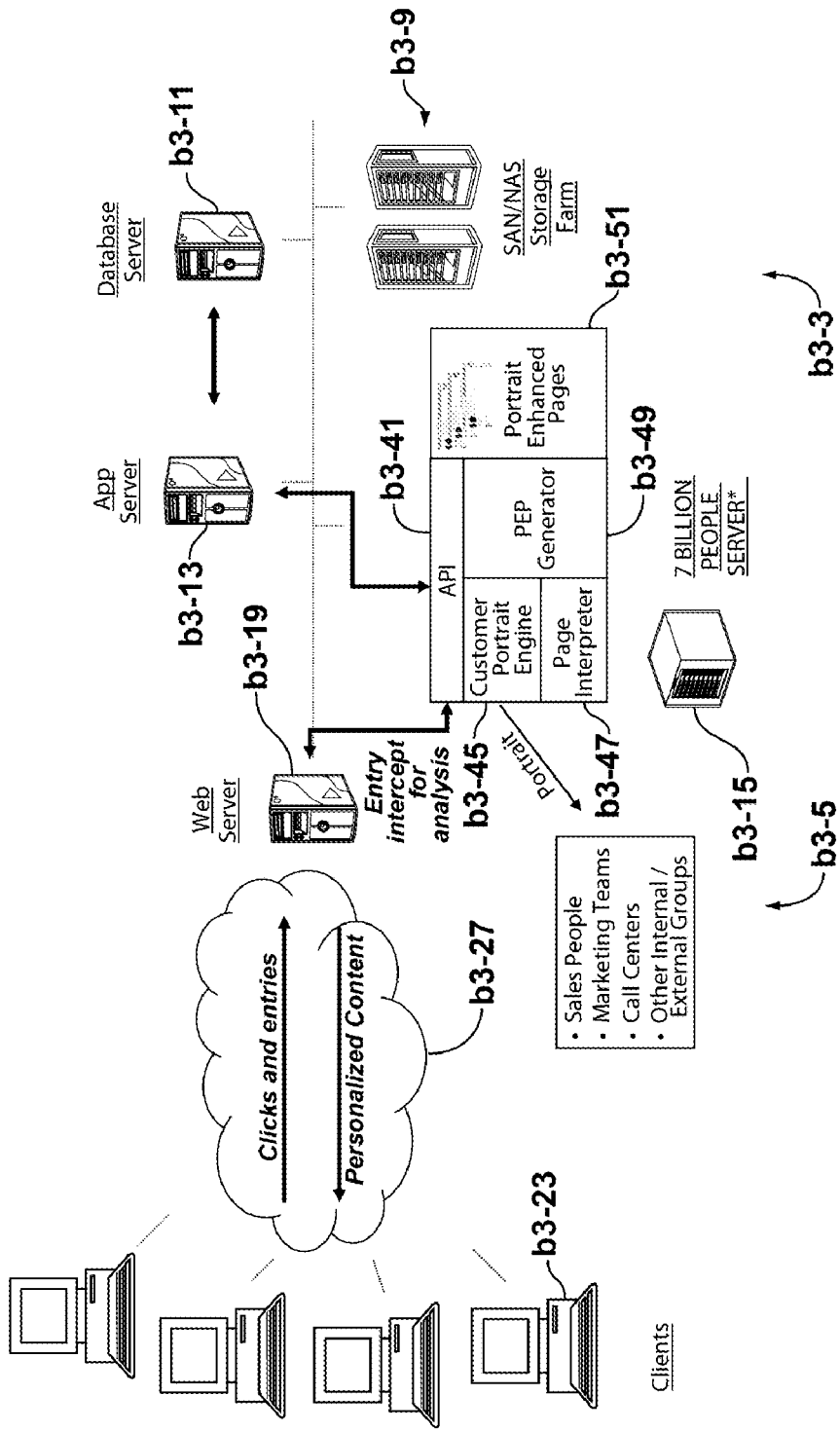
FIG. 7 is an illustration of a particular, non-limiting embodiment of a network equipped with a dedicated server appliance for implementing some of the software and methodologies taught herein.

FIG. 7 depicts a second embodiment of a system made in accordance with the teachings herein. The system b3-1 depicted therein is similar in many respects to the system depicted in FIGS. 5-6. However, while the system depicted in FIGS. 5-6 passes a portrait between the server appliance b1-15 and the application server b1-13 to generate re-mashed web content, in the system b3-1 depicted in FIG. 3, the server appliance b3-15 generates the re-mashed web content directly. Thus, in this system b3-1, the server appliance b3-15 receives and analyzes user input from the server b3-19, builds a behavioral portrait for the user (or modifies an existing behavioral portrait for the user), generates a new web page (or Portrait Enhanced Page (PEP)), and provides the PEP to the e-commerce web server b3-19 for display to the user (assuming that the e-commerce site accepts the PEP).

It will thus be appreciated that the server appliance b3-15 in FIG. 3 may be implemented as a "black box" device which intercepts user behavioral data and outputs re-mashed web pages based on that data. Such a device is advantageous in some applications in that it provides a means by which the provider of the device can extract a revenue stream from the re-mashed web content using various business models, some of which are described in greater detail below.

The manner in which the server appliance b3-15 achieves the foregoing functionalities may be appreciated from FIG. 7. As seen therein, the server appliance b3-15 comprises an API b3-41 that receives user input from the server b3-19 and outputs PEPs to the server b3-19, and which communicates with the application server b3-13 as necessary to accomplish these tasks. The server appliance b3-15 further includes a customer portrait engine b3-45 which assembles and modifies customer portraits based on behavioral data captured from the server b3-19, a page interpreter b3-47 which interprets the various objects present on a web page, a PEP generator b3-49 which utilizes the customer portrait to generate PEPs, and a PEP database b3-51 where the PEPs so generated are stored. Though not explicitly shown, the server appliance b3-15 may further include a portrait database for storing customer portraits generated by the customer portrait engine b3-45.

The server appliance b3-15 in the system b3-01 of FIG. 7 is further adapted to communicate customer portraits, or information contained in or relating to customer portraits, to various third parties b3-55. Such third parties b3-55 may include, without limitation, sales people, marketing teams, and call centers, and may utilize this data to more effectively communicate with the customer, either directly or via the Internet or another suitable network.

The particular, non-limiting embodiments depicted in FIGS. 5-7 implement some of the methodologies described herein by incorporation of a dedicated server appliance into the server side of the network. Such an appliance solution is useful in some applications in that it provides the ability to architect the solution "out-of-band" with the current architecture, and also provides a platform for the owners of a website to develop specific content for a user's portrait in the future (this may include, for example, specific marketing offers on an e-commerce website). However, it will be appreciated that various other means are also possible for implementing some of the methodologies described herein.

For example, some of these methodologies may be implemented as a software solution adapted to co-exist on a given web-server or back-end server. In such embodiments, the dedicated server appliance may be a hosted system. Instead of residing behind the client's firewall and web servers, the appliance may reside in a central location (for example, at an ISP (internet service provider)). The software code used to observe customer web sessions and to develop behavioral portraits may be injected into the client web site using a JavaScript snippet placed in the client's web page templates. These JavaScript snippets may be activated in real-time to insert the most current JavaScript code from the host system into the web page on demand. The JavaScript may then send the customer's click stream or other captured information back to the portrait engine on the hosted system. Using this captured information, the portrait engine generates a behavioral portrait for the customer, which is stored in a portrait database on the hosted system.

In a similar manner, a portrait enhanced page (PEP) may be generated using JavaScript code that is injected into the client web page (or a template from which the web page is derived) using one or more JavaScript snippets which are inserted by the client into their web page structure. Following the same approach as described above, a PEP generator may utilize the customer portrait to generate PEPs. The difference in this case is that the software code for the PEP generator resides on a hosted system instead of a dedicated server appliance behind the client firewall.

Figure 8:
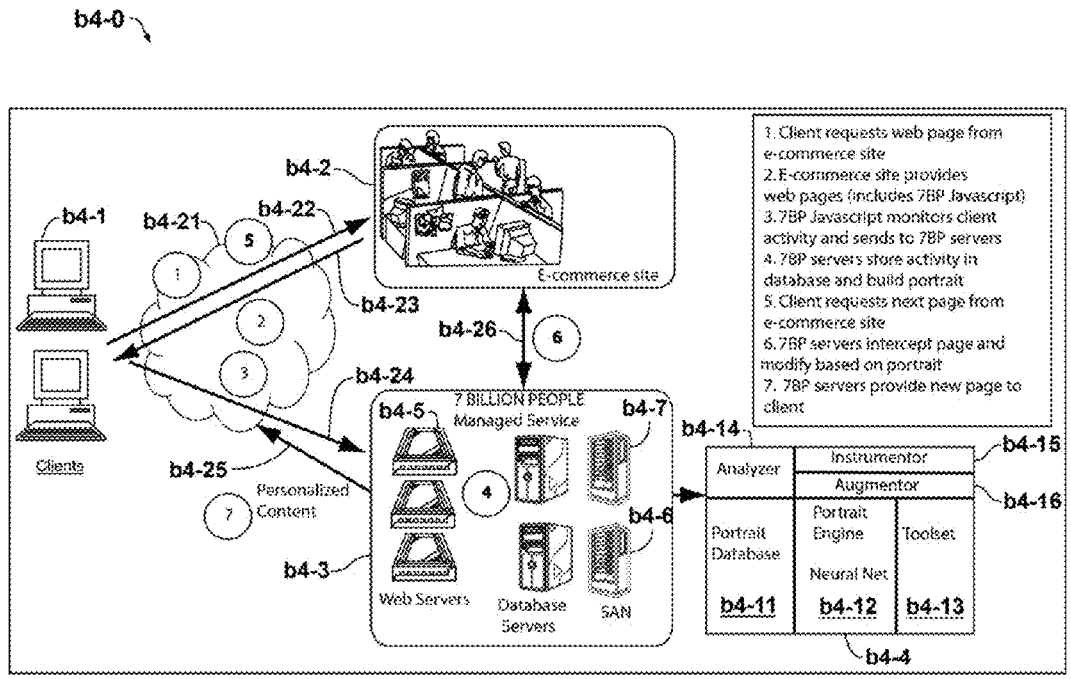
FIG. 8 is an illustration of a particular, non-limiting embodiment of a network architecture for implementing some of the software and methodologies taught herein.

FIG. 8 depicts a particular, non-limiting embodiment of the foregoing type of implementation. In the system b4-0 depicted therein, a client b4-1 is in communication with an e-commerce site b4-2 and a service provider b4-3 over the Internet or another WAN b4-21. A dedicated server appliance b4-4 is present as a hosted system at the location of the service provider b4-3.

In operation, the client b4-1 requests a webpage from the e-commerce site b4-2. The e-commerce site b4-2 provides the requested web page, which includes JavaScript of the type previously described. The JavaScript monitors the web activity of the client b4-1, and sends information about that activity to the web servers b4-5 of the service provider b4-3. The web servers b4-5 store the information in one or more database servers b4-6, where it is used by the dedicated server appliance b4-4 to build user behavioral portraits. When the client b4-1 requests the next web page from the e-commerce site b4-2, the web servers b4-5 intercept the requested web page and modify it based on the user's behavioral portrait. The web servers b4-5 then provide the modified web page to the client b4-1.

The hosted server appliance b4-4 in the particular system b4-0 depicted in FIG. 8 consists of a portrait database b4-11, a portrait engine b4-12 (which may be based on a neural network), a tool set b4-13, an analyzer b4-14, an instrumentor b4-15, and an augmentor b4-16. The analyzer b4-14 analyzes information concerning the client's web activity as captured by the JavaScript inserted into the client's web page templates, and works in conjunction with the portrait engine b4-12 to develop a user portrait which is then stored in the portrait database b4-11. A variety of callable programs, functions, routines and the like may be used in this analysis which are stored in the toolset b4-13. The augmentor b4-16 then utilizes portraits contained in the portrait database b4-11 to provide modified web content. The instrumentor b4-15 assembles the modified web content into a modified web page which is forwarded to the client b4-1. In order to instrument a site, the major set of web-page templates is identified. The sections of the web page, and the existing portrait bias of each, are then categorized. Modifications to the sections are dependent on the type of portrait bias of that section.

Other variations and embodiments of the foregoing systems are also possible. For example, while the user portraits are preferably stored in a portrait database (see, e.g., profile database b1-43 of FIG. 6), in some embodiments of the systems and methodologies described herein, these portraits may be stored instead on a cookie defined in a client device, assuming this is permitted by the user's privacy software. In such embodiments, the dedicated server appliance may be adapted to collect the user information from the client device as necessary via a server. It will be appreciated that hybrids of this embodiment are also possible, where some user portraits (or portions thereof) are stored in the portrait database, and other user portraits (or portions thereof) are stored on a cookie defined in a client device. In still other embodiments, the software for implementing the methodologies described herein may be installed on a web server, which may query the client device at appropriate intervals for updated user input information.

C. Generation of a User Behavioral Portrait

In a preferred embodiment, the software described herein applies a (possibly complex) algorithm to determine an individual's psychological portrait score by interpreting the individual's navigation through a website hosted by a server. The scoring mechanism utilizes a derivative of a technique known as "meta-linguistic programming".

In particular, the algorithm weights user actions that can take place on a given website by category, and also by specific lexical analysis. Predicate and historical analysis is also input into the weighting. The algorithm is preferably adapted to reset to a generic weighting under appropriate circumstances to ensure that model inaccuracies or exceptional behavior can be accommodated.

Preferably, the algorithm is characterized by a tipping point so that, once a sufficient portrait weighting is achieved, the software portrait triggers a number of potential actions on the website. These actions may include, without limitation, re-mashing of the current website content for emphasis of particular data, re-routing procedures to suit a user's behavior in the current context, re-wording website content in accordance with a user's presentation preferences, and re-presentation of, for example, marketing offers to focus on the user's current context and portrait.

The methodologies described herein, and the systems and devices which implement them, offer a number of potential advantages. In particular, these methodologies may be used to dynamically reconfigure web pages to make them commensurate with a user's current behavioral portrait. As a result, the user will feel more comfortable on the website, will be less likely to browse away from the website, and will be more likely to return to the website in the future. This, in turn, will increase the likelihood of closure on the sale of products or services advertised on the website, will allow marketing offers to be customized for that user's portrait at that particular time, and will provide the user with customized procedures on the website.

The customer portraits which are generated may also be provided to sales teams, marketing teams, call-centers, or other such entities. These entities can use the information contained therein to personalize conversations and advertising campaigns for the respective users.

Some of the methodologies described herein also provide an effective means for context sensitive marketing. These methodologies provide the means to analyze the first few interactions (e.g., mouse clicks) with a website and apply that information to establish a behavior portrait (frequently with respect to buying patterns) for the user for subsequent interactions. These methodologies also provide the means to analyze the phraseology and syntax of a search, and apply that information to the user's portrait for improved click-through. All subsequent user interactions in the same session are then customized for the user's preferred information sources, preferred marketing messages, preferred sales approach, and the like.

In a preferred embodiment of the methodologies described herein, a meta-linguistic process is utilized which comprehends fifteen different psychological attributes for a given user. These attributes are described briefly in TABLE C1 below. Of course, it will be appreciated that various other psychological attributes (of greater or lesser number) could be utilized in the systems, methodologies and software described herein. It will also be appreciated that various combinations or sub-combinations of these or other psychological attributes may be utilized in these systems, methodologies and software, or in a given application or task. Moreover, the number of attributes utilized may vary from one application to another, and from one context to another.

TABLE C1

PSYCHOLOGICAL ATTRIBUTES

| Psychological Attribute | Description |
| --- | --- |
| 1 Decision Making | Determines the way in which the customer makes decisions, via information or reference |
| 2 Motivation | Determines the rational for the website visit and completing a transaction-should the product offer an opportunity or prevent a problem |
| 3 Information Presentation | Indicates how a customer prefers to receive information-process-based preferences versus behavior that demands alternatives |
| 4 Adoption Stage | Indicates when, in the product life-cycle, a customer is comfortable making a purchase-early adopter versus conventional adoption tendency |
| 5 Relationships | Describes the level of personal interaction desired by a customer and amount of personal relationship for transaction/product |
| 6 Specificity | Indicates the level of detail a customer prefers |
| 7 Frequency | Indicates the frequency/repetition of message required to close |
| 8 Teamwork | Defines level of independence versus gradation of interaction (decision making and product use) |
| 9 Rules | Determines agreed method of transaction - rules of the transaction |
| 10 Speed | Determines rate of navigations/speed of clicks - indicates surety of other weightings - can indicate level of decisiveness |
| 11 Empathy | Indicates the consideration/impact of decisions on other people |
| 12 Intensity | Indicates level of intensity of transaction/dialog |
| 13 Temperature | Determines comfort of color preference in context of transaction/dialog |
| 14 Shade | Determines visual stimuli and environment preference |
| 15 Pattern | Second level visual stimuli and environmental preferences |

Each psychological attribute is suitably weighted by the Customer Portrait Engine. Preferably, this weighting occurs on a numerical scale which is given an almost infinite number of context-sensitive and real-time permutations for any given user at any given time. For example, if the Customer Portrait Engine utilizes the 15 psychological attributes noted above, each of these attributes may be tracked using a sliding scale, with 0 as the neutral score. A weighting significantly on either side of neutral would indicate a tendency of behavior toward that setting.

The manner in which user behavior may be correlated to psychological attributes may be better understood by considering some specific examples. For example, a user navigating directly to product specifications would demonstrate behavior typical of one type of decision making tendency, while a user browsing through customer recommendations would demonstrate behavior typical of another type of decision making tendency. A customer clicking on a toothpaste advertisement described as "bright smile" would indicate a behavioral tendency towards one type of motivation, versus a customer clicking on an offer to "prevent tooth decay", which would demonstrate behavior typical of another motivational tendency. A customer navigating through categories in a stepwise fashion (e.g., electronics, TV and video, DVD player) would indicate a behavioral tendency towards one type of information gathering, versus a user selecting different categories which would indicate a behavioral tendency towards another type of information gathering.

EXAMPLE C1

The following example illustrates the application of some of the methodologies taught herein to an e-commerce transaction.

User A decides to purchase a DVD player from a multi-category website (that is, a website which sells electronics, books, clothing, and various other goods and services). The user's pass through the website involves the steps of:
 (a) Searching for a specific DVD player model;
 (b) Checking the detailed specifications of the model;
 (c) Comparing the model with other top sellers;
 (d) Adding the selected model to the shopping cart;
 (e) Choosing expedited shipping; and
 (f) Checkout.

Figure 9:
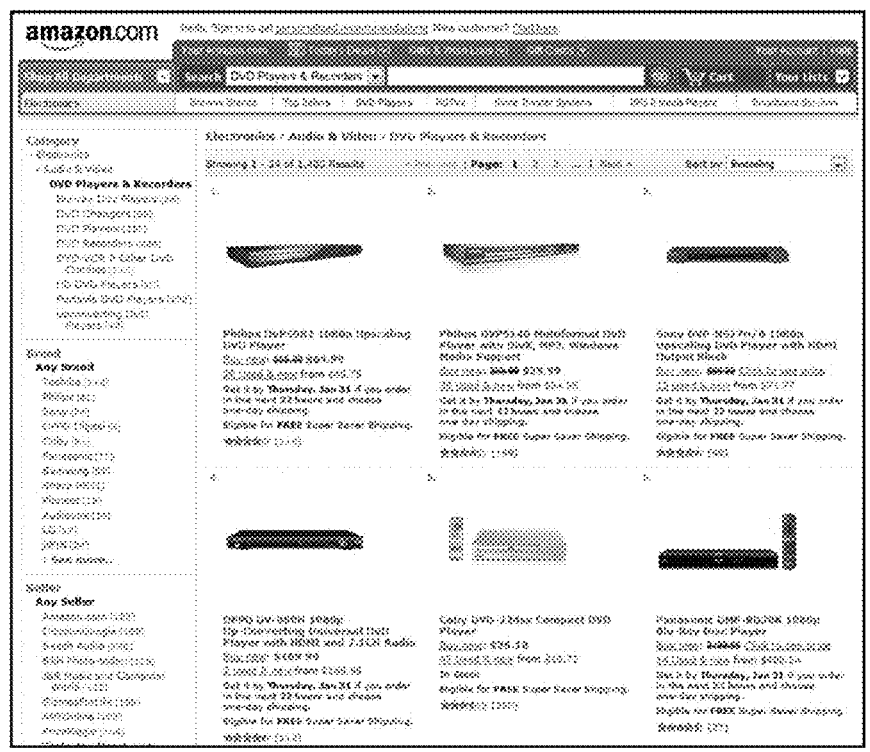
FIG. 9 is an illustration of a web page.
Figure 10:
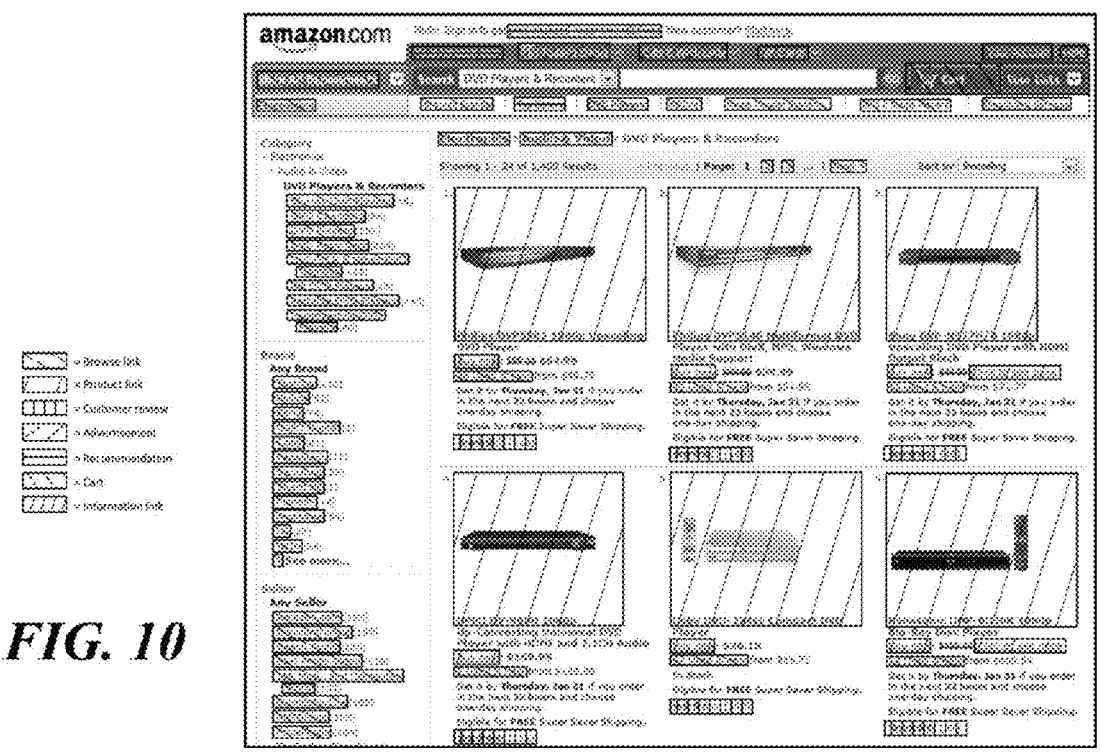
FIG. 10 is an illustration of the web page of FIG. 9 with a color overlay illustrating the categorization of objects appearing thereon.

Each of these individual actions during the web session can be mapped to a set of rules or a knowledge base in the Portrait Engine. An example of such a mapping is shown in FIGS. 9-10. In particular, FIG. 9 shows a standard e-commerce web page with a selection of electronics products, specifically DVD Players. FIG. 10 shows the same web page with a link overlay showing the mapping from each individual link to the associated rule set within the knowledge base.

As User A performs the search in Step (a), a rule in the knowledge base is triggered to recognize a search for a specific item with multiple terms. This type of search indicates an independent decision making behavior. Therefore, the score on the Decision Making attribute (see TABLE C1 above) is increased by 10 points. Similarly, Steps (b) and (c) trigger rules for information gathering, again indicating independent decision making behavior and increasing the score on that attribute to +30. Given the collection of Steps (a) through (d)—identifying a specific product, gathering specification data, comparing to similar models, and then selecting the individual DVD Player—the knowledge base rules recognize procedural behavior. Therefore, the score on the Information Presentation attribute is increased by 20 points. In Step (e), User A displays goal-oriented behavior by expediting the shipping for this product and the knowledge base decreases the score on the Motivation attribute by 10 points. Therefore, in this example, User A's scores for the first three attributes in Table C1 are:

TABLE C2

User A score

| | Psychological Attribute | Score | Behavior |
|---|---|---|---|
| 1 | Decision Making | +30 | Independent decision making |
| 2 | Motivation | −10 | Goal-oriented motivation |
| 3 | Information Presentation | +20 | Procedural information presentation |

By comparison, User B also goes to the same website to buy a DVD player, and this user's e-commerce dialog is as follows:
 (a) Select electronics category;
 (b) Select DVD Players;
 (c) Choose "Top 10 Sellers";
 (d) Select number 1 seller;
 (e) Check what other people said about this model;
 (f) Check editorials and reviews;
 (g) Select another player referenced in the reviews;
 (h) Sort and read reviews from most negative to least negative; and
 (i) Checkout and purchase the referenced DVD player.

Again, with the mapping from the links and actions on the web site to the rules in the knowledge base of the Portrait Engine, each individual action by User B during this web session drives a score in the behavioral portrait. In the case of User B, the focus on the recommendations and reviews of other customers, shown in Steps (c) through (h), demonstrate a collaborative decision making behavior. The rules triggered by these steps collectively decrease the score on the Decision Making attribute by 30 points. The shift in User B's product direction, demonstrated by Step (g), triggers rules which decrease the score on the Information Presentation attribute by 10 points, indicating a choice-oriented preference. In Step (h), User B exhibits a desire to avoid problems, and the rules increase the score on the Motivation scale by 20 points. In this example, User B's scores for the first three attributes in Table C1 are as follows:

TABLE C3

User B score

| | Psychological Attribute | Score | Behavior |
|---|---|---|---|
| 1 | Decision Making | −30 | Collaborative decision making |
| 2 | Motivation | +20 | Problem-avoidance motivation |
| 3 | Information Presentation | −10 | Choice-oriented preference |

Both users A and B have displayed key behavioral patterns in each of the transactions which can be used to dynamically reconfigure the web pages displayed on the website. Referring again to FIGS. 5-6, clicks and entries are passed from the clients' web browsers b1-23 through the Internet b1-27 to the enterprise web server b1-19. At this point, the web server b1-19 passes the entry information through to the dedicated server appliance b1-15 via the API b1-41 software component (in embodiments in which the methodology is implemented with software installed on an application server, the web server b1-19 would pass the entry information to the appropriate application server b1-13 instead).

The API b1-19 passes the entry and user identification information through to the portrait generator b1-45, which interfaces with the portrait database b1-43 for historic user patterns and portrait information. At this point, a current portrait is generated for that user at that time. If the current portrait is determined to be strong enough for representation of the website data, the portrait and trigger is passed to the enterprise application server b1-13 responsible for presenting the website information to the web server b1-19 for potential re-mashing of content and offers. The result of the processing in an e-commerce application is a user-personalized web-page in the context of the current user behavior and buying pattern.

In some embodiments, an initial matrix of behaviors may be utilized to establish an initial portrait for a user. Such a matrix may reflect the fact that consumers have different personalities, and exhibit different behaviors, based on time and topic. Such behaviors may be hard-wired, and may directly impact how a consumer feels when they are presented with information concerning a product or service.

EXAMPLE C2

This example illustrates how user behavior may be tracked, weighted and utilized to develop a behavioral portrait for the user.

A user's behavior on a website is recorded and analyzed. That behavior may include such factors as:
(a) navigation selections (which navigation choices are made on the site);
(b) search text parsing and analysis (search used to navigate to a particular area on the site in conjunction with term analysis);
(c) icon selection (where the user clicks);
(d) marketing offer selection (the type of marketing offer a user selects);
(e) order of behavior (e.g., whether the user engages in seemingly random "browsing" or more focused selections);
(f) speed of navigation (timed clicks, e.g., speed of checkout or skipping less relevant pages); and
(g) omitted selections (what the user does not do or select).

After each action, the user's portrait is recalculated. This calculation is based upon a dynamic (real-time) weighting for each of the 15 tracked psychological attributes shown in TABLE C1, with each attribute having a neutral setting of 0. The calculation also considers historical knowledge of that user's previous behavior in known dialogs, and the previous weightings in the current dialog. Each of the 15 behaviors in TABLE C1 is tracked using a sliding scale with 0 as the default weighting for each attribute. A weighting significantly on either side of 0 indicates a tendency of behavior toward that setting.

As a specific example, a user may display the portrait depicted in TABLE C4 below:

TABLE C4

Example Psychological Attribute Weighting

| | Psychological Attribute | Weight |
|---|---|---|
| A | Decision Making | 49 |
| B | Motivation | 62 |
| C | Information Presentation | −53 |
| D | Adoption Stage | −77 |
| E | Relationships | 0 |
| F | Specificity | 0 |
| G | Frequency | 28 |
| H | Teamwork | 0 |
| I | Rules | 65 |
| J | Speed | 0 |
| K | Empathy | 0 |
| L | Intensity | 0 |
| M | Temperature | 0 |
| N | Shade | 61 |
| O | Pattern | −33 |

Such a user is demonstrating behaviors in A, B, C, D, G, I, N and O that are significant enough to trigger a website change.

The Portrait Engine or Portrait Generator is preferably used to dynamically recalculate the customer's scores on each of the attributes during the web session. The Portrait Engine also preferably considers historical knowledge of that user's previous behavior in known dialogs, and the previous weightings in the current dialog. The engine may be based on a transition table, a rule-based knowledgebase, other forms of artificial intelligence tools, or various combinations or sub-combinations of any of those tools.

While individual significant weightings (that is, weightings which might impact the website display, format or navigation route) may be sufficient to change web page content or layout in some of the embodiments described herein, preferably, combinations of attributes, the user's behavioral history, and the context of the dialog will be used to set the "trigger" flag and to intercept and analyze the web page being displayed to the user. Typically, the page to be displayed will be modified (that is, a Portrait Enhanced Page (PEP) will be generated). As previously stated, triggers and fail-safes may be implemented throughout the system to ensure that PEPs are not displayed until the behavior is known with a degree of certainty, or, for example, if the user demonstrates behavioral swings while in a transaction.

D. Modification of Web Site Content Based on User Behavioral Portrait

It will be appreciated that Portrait Enhanced Pages (PEPs) may be produced in the methodologies taught herein by amending web pages in a number of ways. Such changes include, but are not limited to:
(a) content reorganization/re-prioritization;
(b) content addition;
(c) content deletion;
(d) style alterations of content (i.e. highlighting, changing font/size/color, borders, padding, etc);
(e) content folding (placing content in collapsible/expandable containers);
(f) marketing offer personalization;
(g) icon personalization;
(h) language personalization;
(i) expedited navigation paths through the website;
(j) elongated (added pages) navigation paths through the website.

Figure 12:
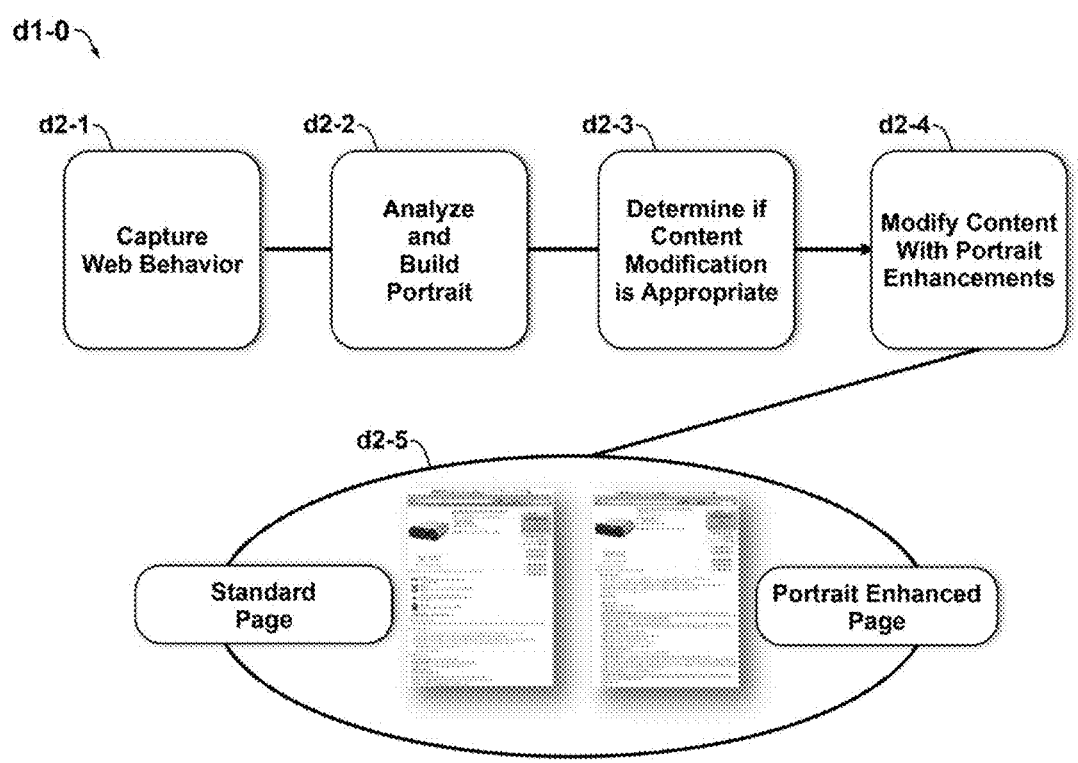
FIG. 12 is an illustration of a standard web page as compared to a portrait enhanced web page of the type which may be generated through the application of some of the methodologies described herein.
Figure 13:
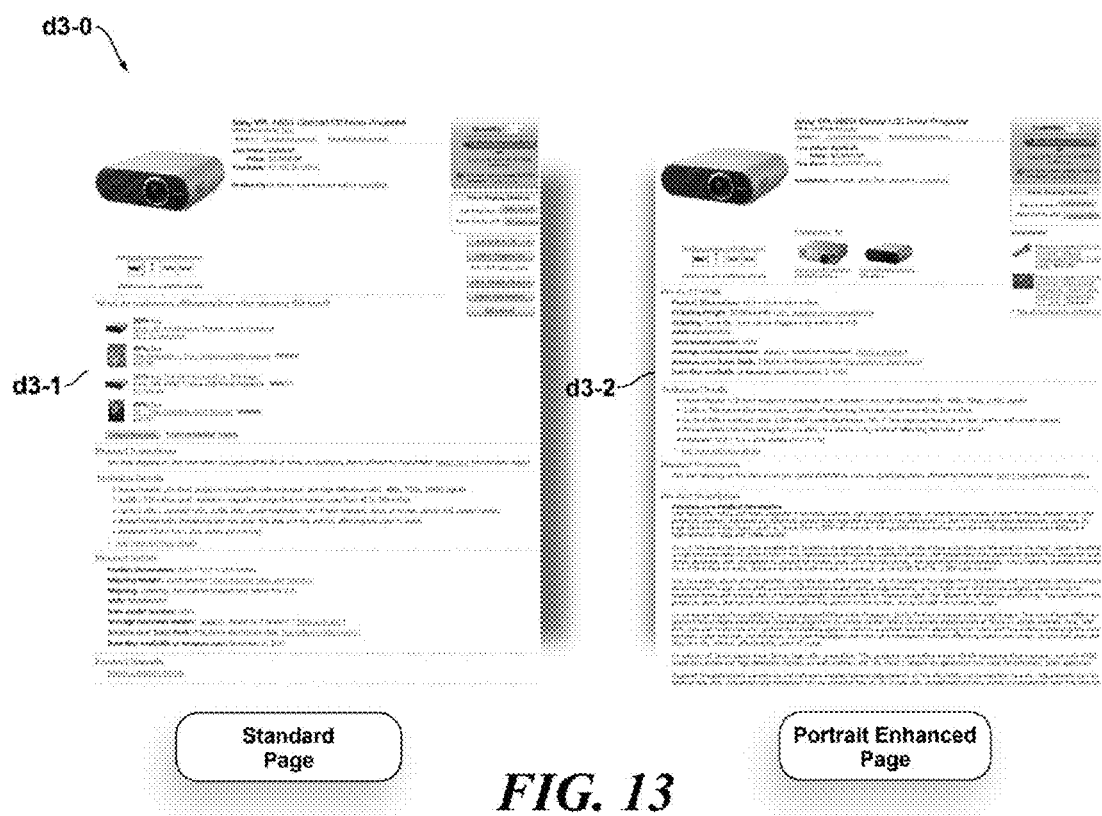
FIG. 13 is an illustration depicting the web pages of FIG. 12 in greater detail.

As previously noted, in some embodiments, the methodologies described herein may be utilized to modify or augment web page or website content or presentation as a function of user behavioral portrait. This process may be appreciated with respect to FIG. 12. As seen therein, the behavior of a user on a website is captured d2-1, and is analyzed to build a behavioral portrait d2-2 for that user. It is then determined whether content modification is appropriate in light of the user's behavioral portrait d2-3. If so, the content on the website is modified, augmented or enhanced d2-4 in light of the user's behavioral portrait. Typically, as seen with reference to the sample web pages d2-5 (shown in greater detail in FIG. 13), this will result in a portrait enhanced web page which is substantially different from the standard, unmodified web page.

Figure 11:
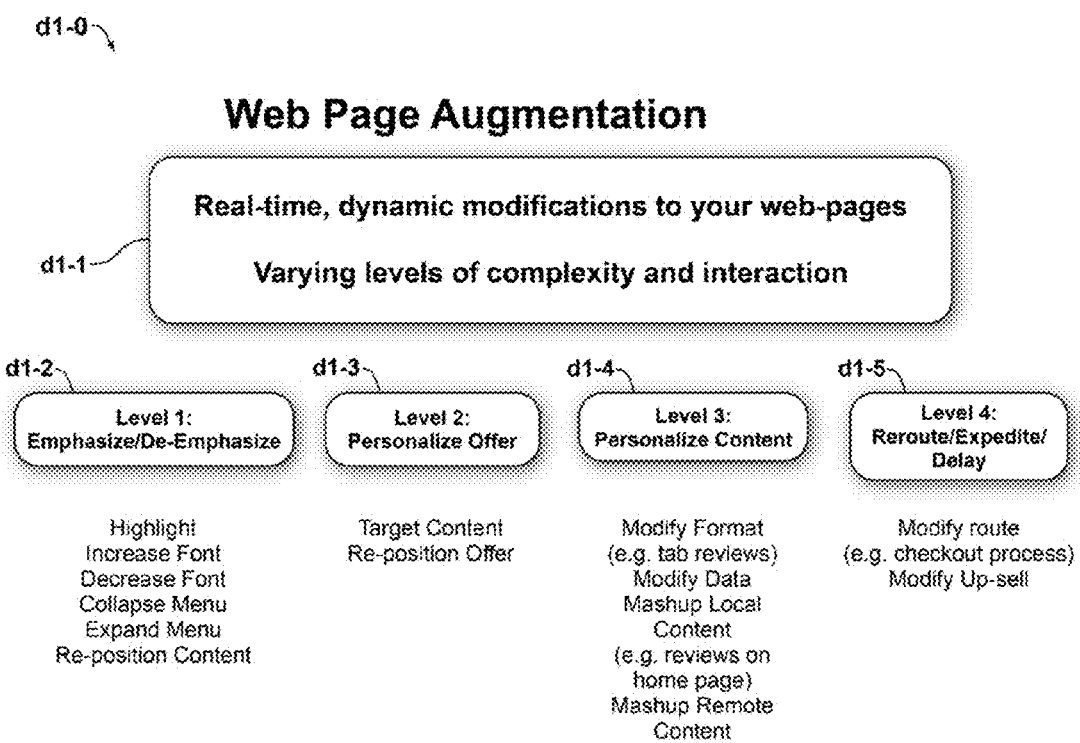
FIG. 11 is a chart depicting the various levels of webpage customization possible in accordance with some embodiments of the methodologies described herein.

FIG. 11 provides an overview of some possible types of webpage modification that may be effected with some of the methodologies described herein. As seen therein, these modifications preferably occur dynamically and in real-time, and may involve varying levels of complexity and interaction with the user.

In the particular embodiment depicted in FIG. 11, the first level d1-2 of web page augmentation involves emphasizing or de-emphasizing certain content. This may result in content being highlighted or being presented with an increased or decreased font size. It may also result in the collapse or expansion of certain menus, and in the repositioning of content within a given web page.

Again referring to the particular embodiment depicted in FIG. 11, the second level d1-3 of webpage augmentation involves personalizing offers appearing on the web page. This may involve, for example, presenting banner ads, pop-ups, or hot links whose content is targeted to the user based on their behavioral portrait. This may also involve repositioning of offers on the web page in light of the user's behavioral portrait.

Still referring to the particular embodiment depicted in FIG. 11, the third level d1-4 of webpage augmentation involves personalizing the content appearing on the web page. This may involve modifying the format in which content appears (e.g., tab reviews), modifying data appearing on the web page, mash-up of local content (e.g., reviews on the home page), and mash-up of remote content.

Still referring to the particular embodiment depicted in FIG. 11, the fourth level D1-5 of webpage augmentation involves the re-routing, expedition or delay of certain webpage content. For example, the check-out process required to purchase an item advertised on the web page may be modified in light of the user's behavioral portrait to ensure a higher level of satisfaction and success. Up-sell processes appearing on the web page (that is, the practice of suggesting higher priced products or services to a customer who is considering a purchase, such as an offer for a better version of the same product or service the consumer is considering purchasing) may also be modified.

The augmentor b4-16 (see FIG. 8) uses portrait attributes and/or type for deciding what applies to a given web page and a specific portrait or portrait type. In a preferred embodiment, the augmentor uses JavaScript injection, which requires the client to include a JavaScript snippet on each page that should be tailored to the current website user. Multiple insertion points may be required, depending on the type of desired modifications and/or page complexity.

Modification of the webpages is preferably accomplished via JavaScript that gets executed in the customer's browser. The JavaScript manipulating the page is preferably structured as rules along with a core library (jQuery+extensions). Only the rules specific for the combination of the client's web-page and the customer's portrait type or attributes will be downloaded into the browser.

The jQuery JavaScript library is preferably utilized for creating rules to identify page sections (portrait-based content) and to manipulate content. Extensions to the jQuery library may be created to simplify rule creation, data selection, and content manipulation. In order to reduce bloat, it is preferred to use two types of extensions: those common across clients, and those specific to a client. In order to further minimize load and processing time, the jQuery library may be reduced to the minimum code set required for the rules. The resulting library may then be compressed.

In order to instrument a site, the major set of web-page templates is identified. The sections of the web page, and the existing portrait bias of each, are then categorized. Modifications to the sections are dependent on the type of portrait bias of that section. The major types of typical content are listed in TABLE D1 below.

TABLE D1

| | Content Types | | |
|---|---|---|---|
| | Decision | Motivation | Presentation |
| Best Sellers | Other | Opportune | |
| Featured Items | Other | | Choice |
| Popular | Other | | |
| Search | Self | | Process |
| Recommendations | Other | | |
| User Reviews | Other | | |
| Expert Reviews | Self/Other | | |
| Promotions | | Opportune | |

TABLE D1-continued

| | Content Types | | |
|---|---|---|---|
| | Decision | Motivation | Presentation |
| Advertisements | Other | | |
| Product Details | Self | | |
| Related Items | Other | | Choice |
| Accessories | | | |
| Support | Other | Safety | |
| Informational | Self | | |
| Crumbs | | | Process |
| Footnotes | | | Process |
| Terms/Policies | | Safety | |

The foregoing types of content may be represented in the following formats:

Headings

Lists/Tables

Links

Text

Images

Form Items

Groupings of the above items.

D1. Level 1 Modifications

Level 1 modifications may include bolding, highlighting, changing the size of text, collapsing sections/lists, repositioning sections, expanding sections/lists, and deleting sections/content using rules based on portrait attributes. Modifications of the identified sections on given web pages depend on the current user's portrait data and on the existing content type in the given sections. For example, reviews and recommended product lists can be collapsed for a 'self' user. Likewise, reviews and recommended product lists might be positioned more prominently on the page for an 'other' user. Examples of some possible modifications which may be implemented for various users are set forth in TABLES D2-D4 below.

TABLE D2

| Modifications of Sections Based on User Behavioral Portrait Type: Self/Other | | |
|---|---|---|
| | Self | Other |
| Best Sellers | Collapse<br>Move to lower positioning<br>Reduce font size and bolding of header and text | Move to higher position<br>Increase font size and bolding of heading |
| Featured Items | Collapse<br>Move to lower positioning<br>Reduce font size and bolding of header and text | Move to higher position<br>Increase font size and bolding of heading |
| Popular | Collapse<br>Move to lower positioning<br>Reduce font size and bolding of header and text | Move to higher position<br>Increase font size and bolding of heading |
| Search | Move to higher position | No manipulation necessary |
| Recommendations | Collapse<br>Move to lower positioning<br>Reduce font size and bolding of header and text | Move to higher position<br>Increase font size and bolding of heading |
| User Reviews | Collapse<br>Move to lower positioning<br>Reduce font size and bolding of header and text | Move to higher position<br>Increase font size and bolding of heading |
| Expert Reviews | No manipulation necessary | No manipulation necessary |
| Advertisements | Remove | No manipulation necessary |

TABLE D2-continued

Modifications of Sections Based on User
Behavioral Portrait Type: Self/Other

| | Self | Other |
|---|---|---|
| Product Details | Move to higher position Increase font size and bolding of heading | Collapse Move to lower positioning Reduce font size and bolding of header and text |
| Related Items | Collapse Move to lower positioning Reduce font size and bolding of header and text | Move to higher position Increase font size and bolding of heading |
| Accessories | No manipulation necessary | Move to higher position Increase font size and bolding of heading |
| Support | Collapse Move to lower positioning Reduce font size and bolding of header and text | Move to higher position Increase font size and bolding of heading |
| Informational | Move to higher position Increase font size and bolding of heading | Collapse Move to lower positioning Reduce font size and bolding of header and text |

TABLE D3

Modifications of Sections Based on User Behavioral
Portrait Type: Opportune/Safety

| | Opportune | Safety |
|---|---|---|
| Best Sellers | Move to higher position Increase font size and bolding of heading | No manipulation necessary |
| Promotions | Move to higher position Increase font size and bolding of heading | Collapse Move to lower positioning Reduce font size and bolding of header and text |
| Support | No manipulation necessary | Move to higher position Increase font size and bolding of heading |
| Terms/ Policies | No manipulation necessary | Move to higher position Increase font size and bolding of heading |

TABLE D4

Modifications of Sections Based on User
Behavioral Portrait Type: Choice/Process

| | Opportune | Safety |
|---|---|---|
| Featured Items | Move to higher position Increase font size and bolding of heading | No manipulation necessary |
| Search | No manipulation necessary | No manipulation necessary |
| Related Items | Move to higher position Increase font size and bolding of heading | No manipulation necessary |
| Crumbs | No manipulation necessary | Move to higher position Increase font size and bolding of heading |
| Footnotes | Collapse Move to lower positioning Reduce font size and bolding of header and text | No manipulation necessary |

D2. Level 2 Modifications

Level 2 modifications preferably target specific portrait types by altering images and/or text. There are at least two options for modifying text or images on a web page. One is to create an explicit augmentor rule, and the other is to define images for a page and section in the portal.

The portal will preferably include web pages where the client can specify images and text that will be dynamically displayed, based on the portrait type of the user. Prior setup work will typically include defining the page templates (URL regex matching) and page sections (jQuery selectors) using friendly names. For example, the product page might have a friendly name of 'Product Page' and the advertising section might have a friendly name of 'Top Right Advertisement'. The user would then be able to specify alternate images/text based on the portrait type. Images may be specified using only a URL. Text content will typically be specified in HTML format.

D3. Level 3 Modifications

Level 3 modifications preferably add or replace content from the client, and add mash-up content from third party web sites. The portal will include web pages where the client can specify an RSS feed or URL from which to retrieve the mash-up content, along with a list of the desired fields from the resulting content. The mash-ups may be handled by the client's development team to provide for optimal performance and client control.

Client content may be retrieved through a number of methods. These may include, without limitation:

- an AJAX request from the web browser to the client's systems, which is then displayed;
- instrumentation of links with a portrait type indicator to allow the client to display appropriate data on subsequent pages;
- client addition of multiple content options (one for each portrait type), which the JavaScript will appropriately display based on portrait type; and
- client data retrieval through the use of a client provided API (this approach is not preferred, as it may require very tight integration and substantial custom code).

D4. Level 4 and 5 Modifications

Level 4 modifications preferably provide re-routing, expediting, and delaying website navigation.

Level 5 modifications preferably involve product description personalization.

In the foregoing process, it is preferred that the clients identify web page sections by ids and classes, as this may result in higher performance and reduced rule volatility. It is also preferred that the client assume as much responsibility for dynamic content as possible, as this may provide for higher performance, greater stability and consistency.

EXAMPLE D-1

This example illustrates the modification of content (on the website of an on-line computer retailer) for two different types of users in accordance with a particular, non-limiting embodiment of the methodologies described herein.

Figure 14:
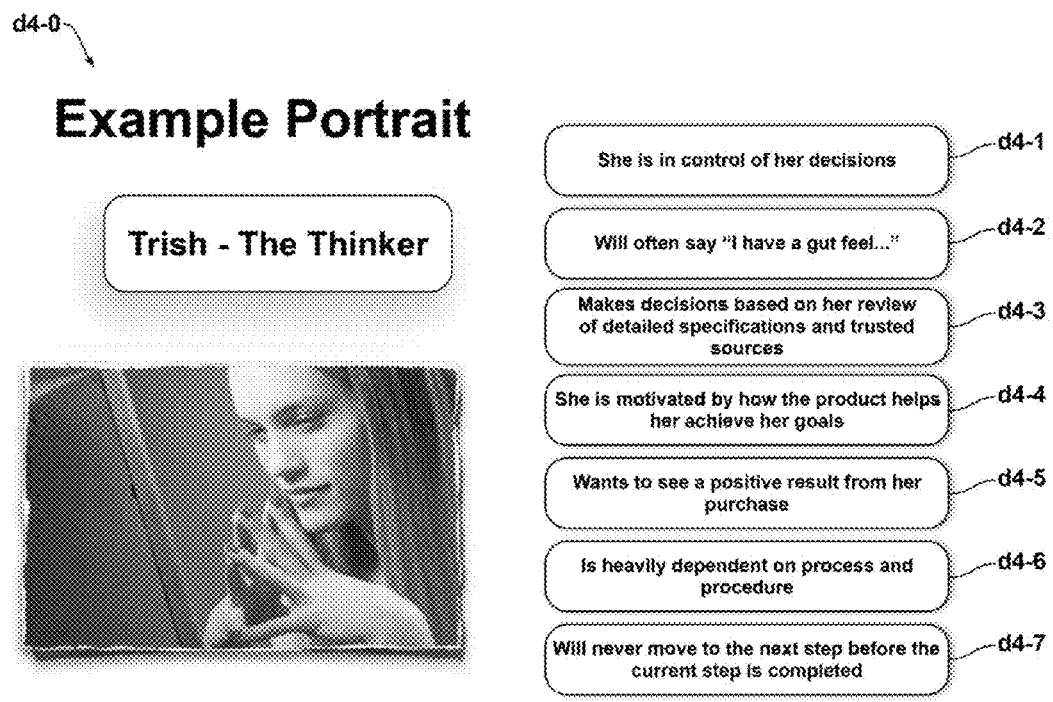
FIG. 14 is an illustration of some of the behavioral characteristics of a particular portrait type.
Figure 15:
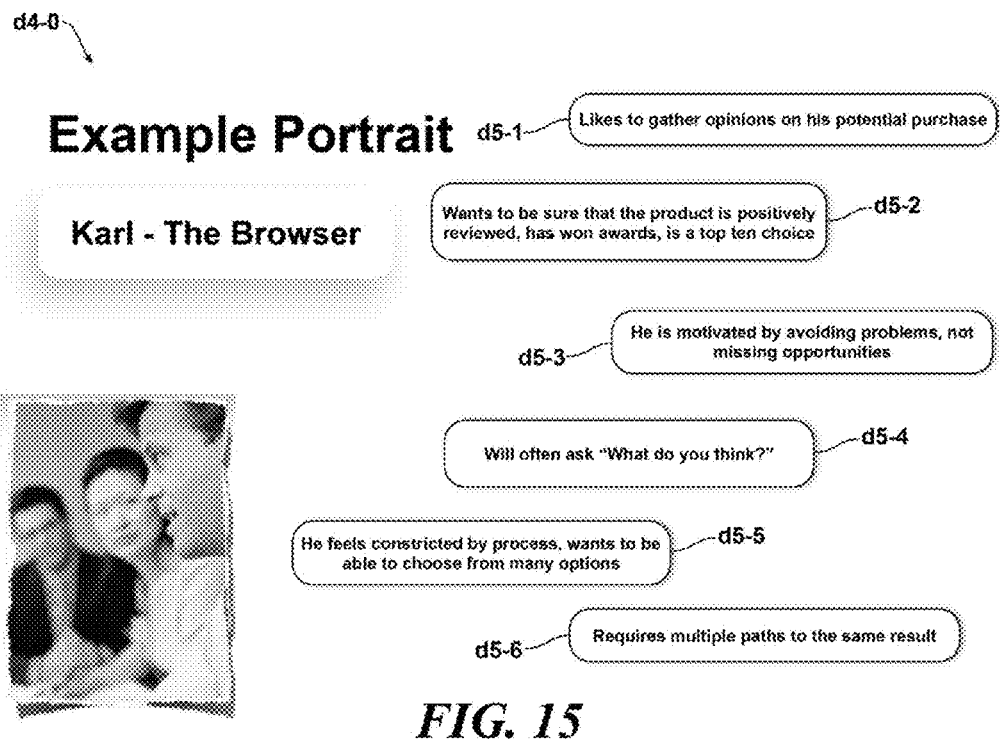
FIG. 15 is an illustration of some of the behavioral characteristics of a particular portrait type.

With respect to FIG. 14 and FIG. 15, some of the behavioral traits of two different hypothetical users are summarized. With respect to FIG. 14, the first user ("Trish") is a "thinker" type user. Trish is a type of user who is in control of her decisions d4-1, and will often say "I have a gut feel" d4-2. Trish typically makes her decisions based on a review of detailed specifications and trusted sources d4-3, and is motivated by how an offered product will help her to achieve her goals d4-4. She wants to see a positive result from her purchase d4-5, is heavily dependent on process and procedure d4-6, and is not likely to move to the next step in a purchase process before the current step is completed d4-7.

By contrast, the second hypothetical user ("Karl" see FIG. 15) is a "browser" type user. Karl likes to gather opinions on his potential purchase d5-1. It is important to Karl that the product is positively reviewed, has won awards, and is a top 10 choice d5-2. Karl is motivated more by avoiding problems then by missing opportunities d5-3. Karl will often ask "What do you think?" d5-4. He feels constricted by process, and wants to be able to choose from many options d5-5. As a consumer, Karl requires multiple paths to the same result d5-6.

Figure 16:
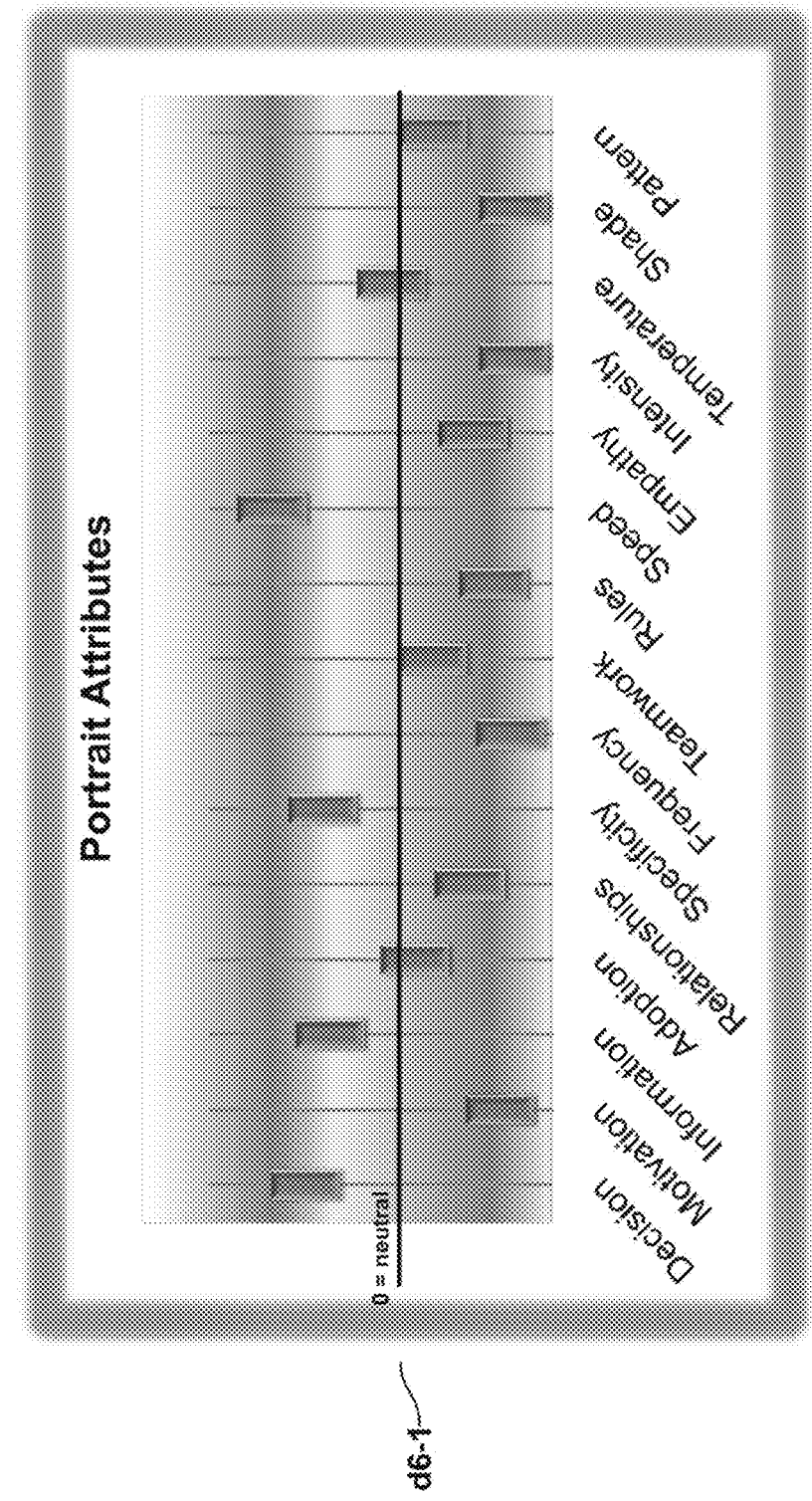
FIG. 16 is an illustration of a behavioral portrait corresponding to the portrait type depicted in FIG. 14.
Figure 17:
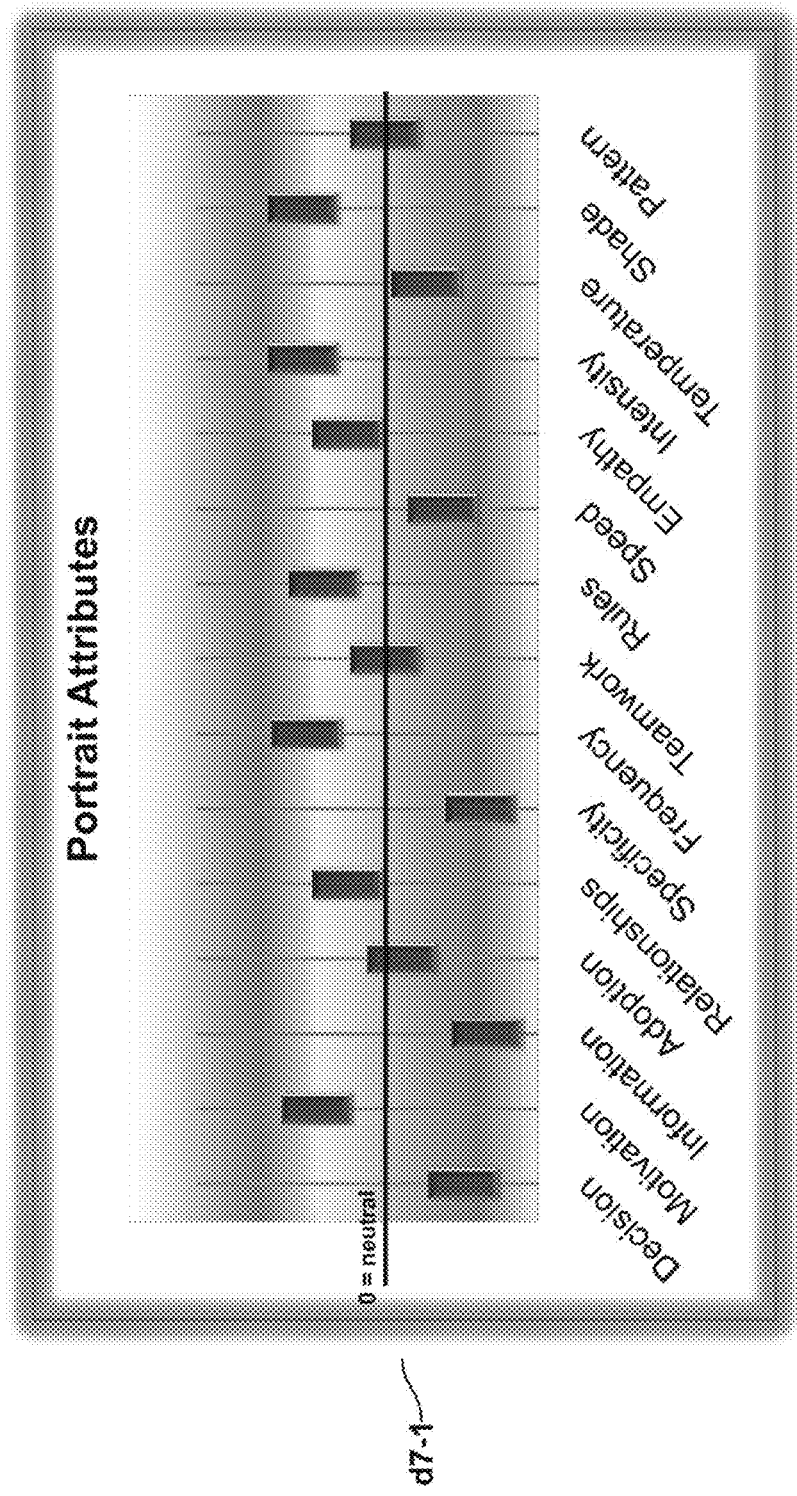
FIG. 17 is an illustration of a behavioral portrait corresponding to the portrait type depicted in FIG. 15.

The behavioral portraits of Trish and Karl are summarized in FIGS. 16 and 17, respectively. As seen therein, their behavioral portraits in this particular embodiment consist of a scaled weighting of 15 different behavioral characteristics, including decision, motivation, information, adoption, relationships, specificity, frequency, teamwork, rules, speed, empathy, intensity, temperature, shade and pattern.

Referring now to FIGS. 18-23, the manner in which particular web pages on a web site are modified in light of Trish's behavioral portrait is illustrated.

Figure 18:
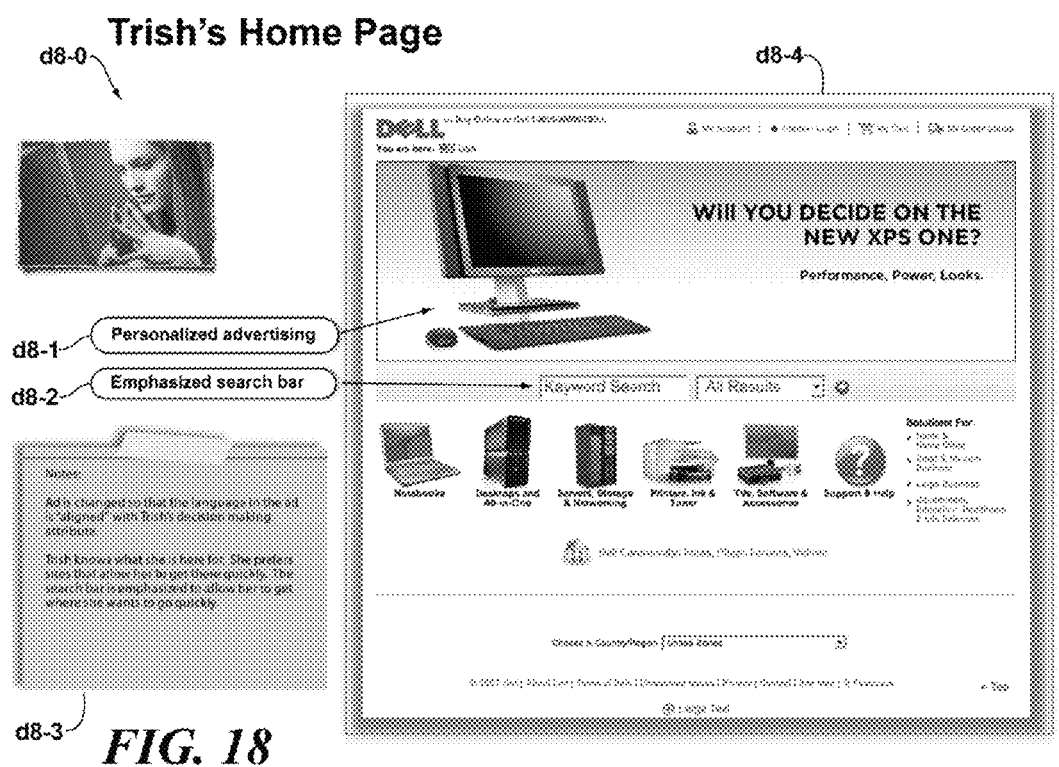
FIGS. 18 through 23 illustrate modifications to a web page in light of the portrait depicted in FIG. 16.

With reference to FIG. 18, on the homepage d8-4 of the web site, the advertisement appearing on the top of the home page is personalized d8-1 so that the language in the advertisement is more aligned with Trish's decision-making attribute. Moreover, the search bar is emphasized d8-2. Given Trish's behavioral portrait, it is likely that Trish knows what she's here for, and she prefers web sites that allow her to get to a result quickly. This behavioral trait is accommodated by emphasizing the search bar, which allows her to navigate through the site more quickly.

Figure 19:
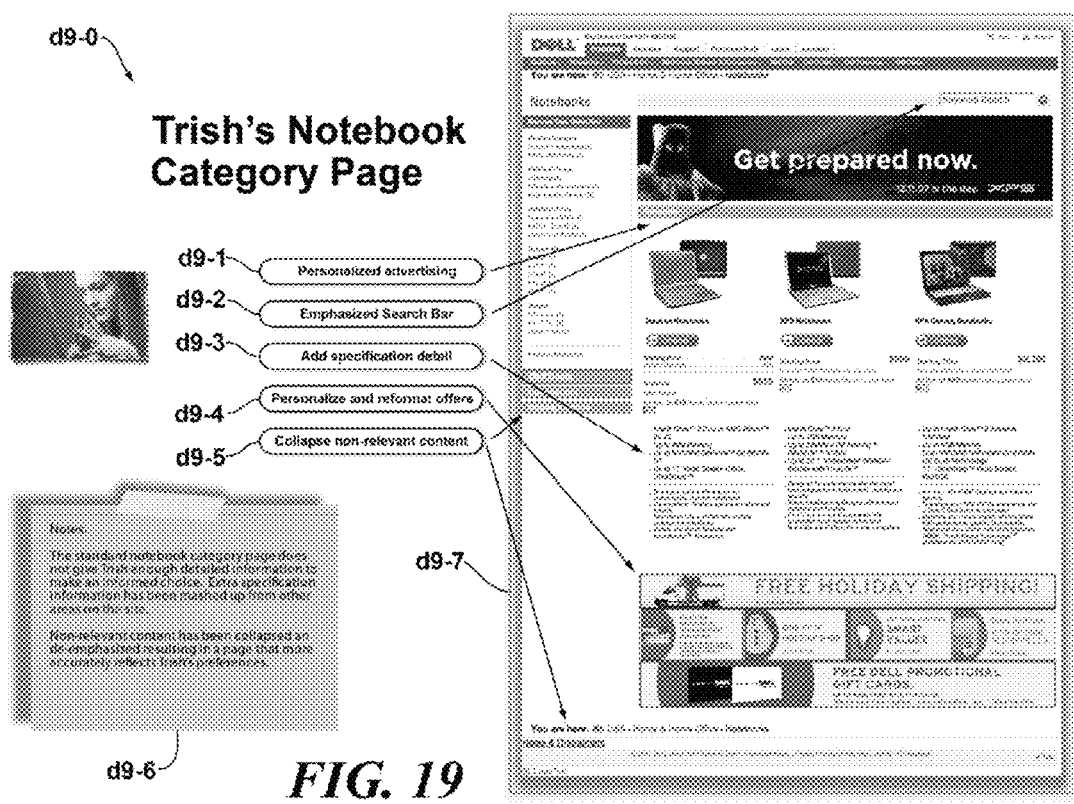

With reference to FIG. 19, on the notebook category page d9-7 of the web site, the fact has been recognized that the standard notebook category page does not give someone of Trish's behavioral portrait sufficient detailed information to make an informed choice. Consequently, the page has been augmented by mashing up additional specification information d9-3 from other areas on the website. In addition, non-relevant content has been collapsed and de-emphasized d9-5, thus resulting in a web page that more accurately reflects Trish's preferences. As with the home page d8-4 (see FIG. 18), advertising has been personalized d9-1 and offers have been reformatted d9-4 in accordance with Trish's behavioral portrait. Also, the search bar has once again been emphasized d9-2 to allow Trish to get to a result quickly.

Figure 20:
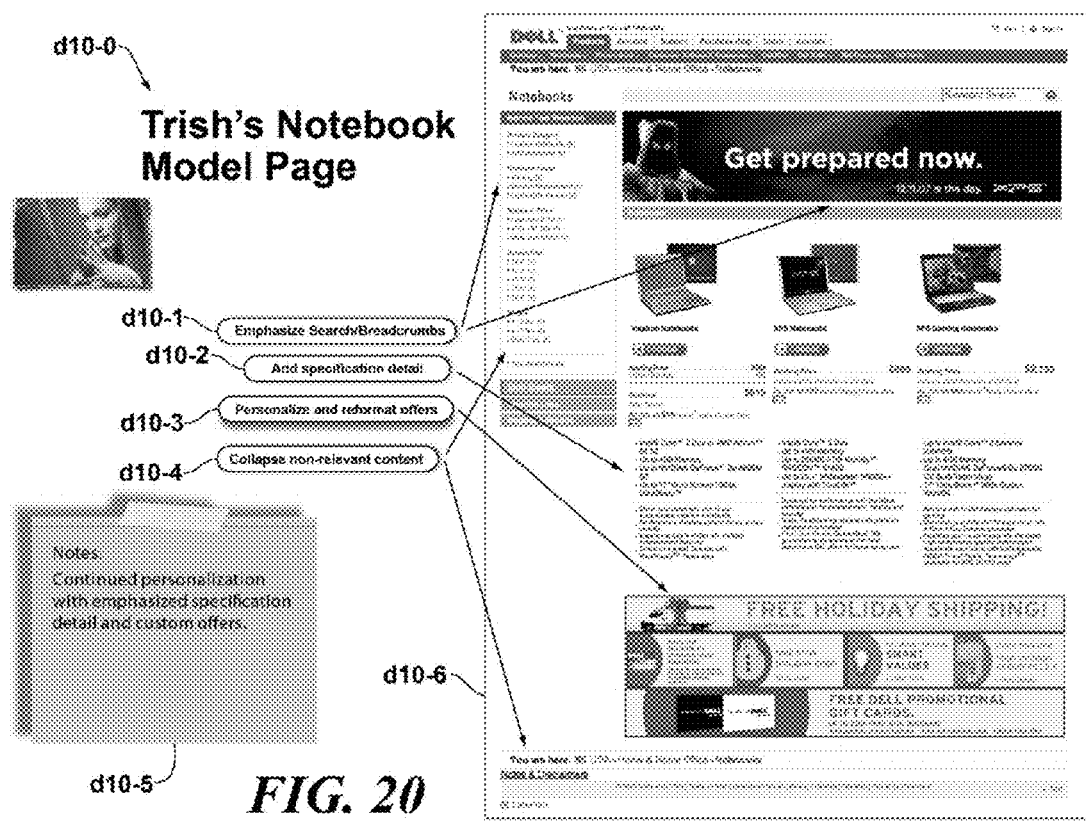

With reference to FIG. 20, the notebook model page d10-6 of the web site has been personalized with the addition of specification detail d10-2 and re-formatted offers d10-3. Non-relevant content has been collapsed d10-4, and search tools/bread crumbs have been emphasized d10-1.

Figure 21:
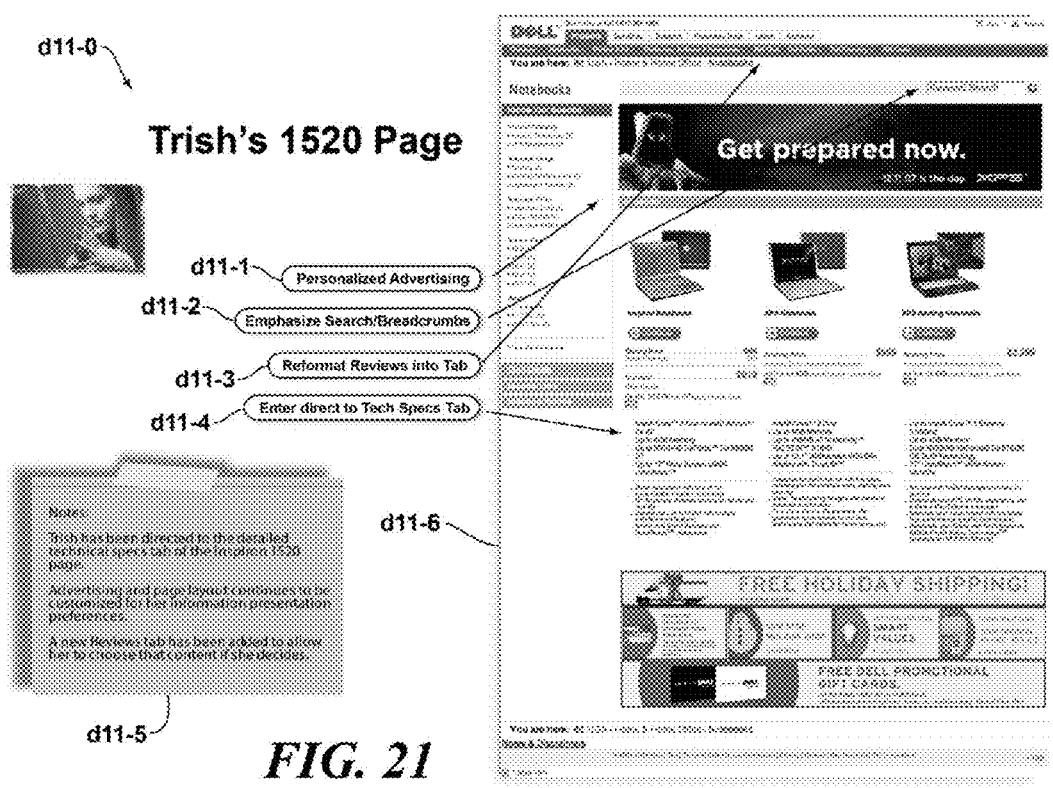

With reference to FIG. 21, the "1520" page d11-6 of the web site has been augmented so that the detailed technical specifications of the product under consideration are opened by default d11-4. The advertising appearing on the web page, and the layout of the web page itself, continues to be customized d11-1 in accordance with Trish's information presentation preferences. The reviews which would ordinarily appear on this web page have been collapsed into a reviews tab d11-3 so that Trish may choose that content if she decides to, but is otherwise not presented with it. Once again, search tools and bread crumbs have been emphasized d11-2.

Figure 22:
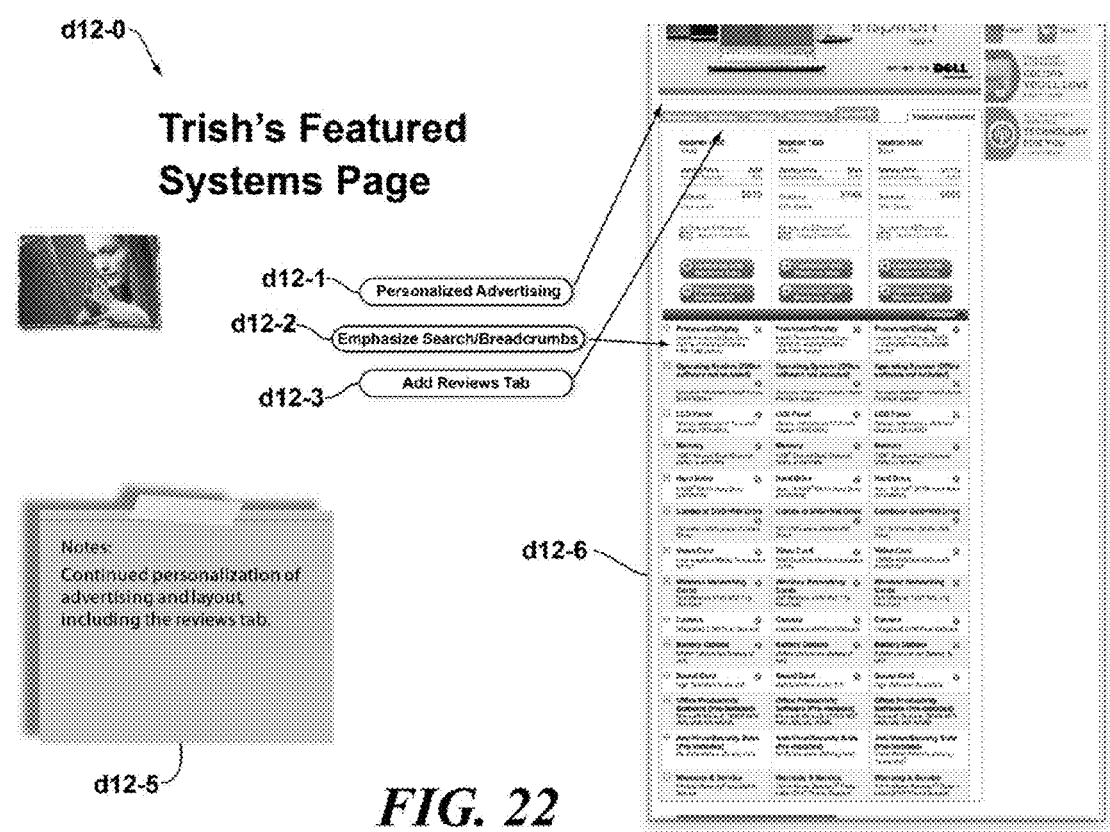

Referring now to FIG. 22, the featured systems page d12-5 of the web site has been customized in light of Trish's preferences with respect to advertising and page layout d12-1. A reviews tab has been added d12-3 to the page so that the information it contains is de-emphasized, but is available to Trish if she chooses it. Search tools and bread crumbs have again been emphasized d12-2.

Figure 23:
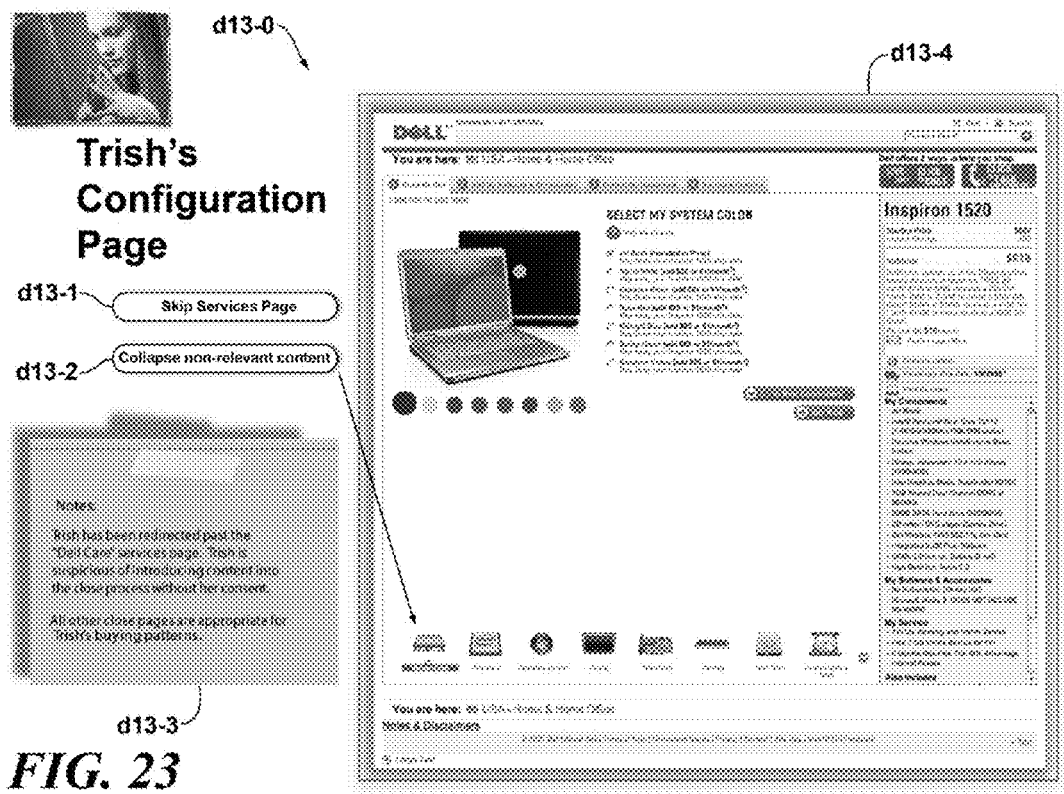

With reference to FIG. 23, the configuration page d13-4 of the web site has been reconfigured so that Trish is redirected past the services page d13-1. This reflects her suspicion of content which is introduced into the close process without her consent. All other close pages which are appropriate for Trish's buying patterns are available. Non-relevant content as been collapsed d13-2.

Referring now to FIGS. 24-29, the manner in which particular web pages on the same web site are modified in light of Karl's behavioral portrait is illustrated.

Figure 24:
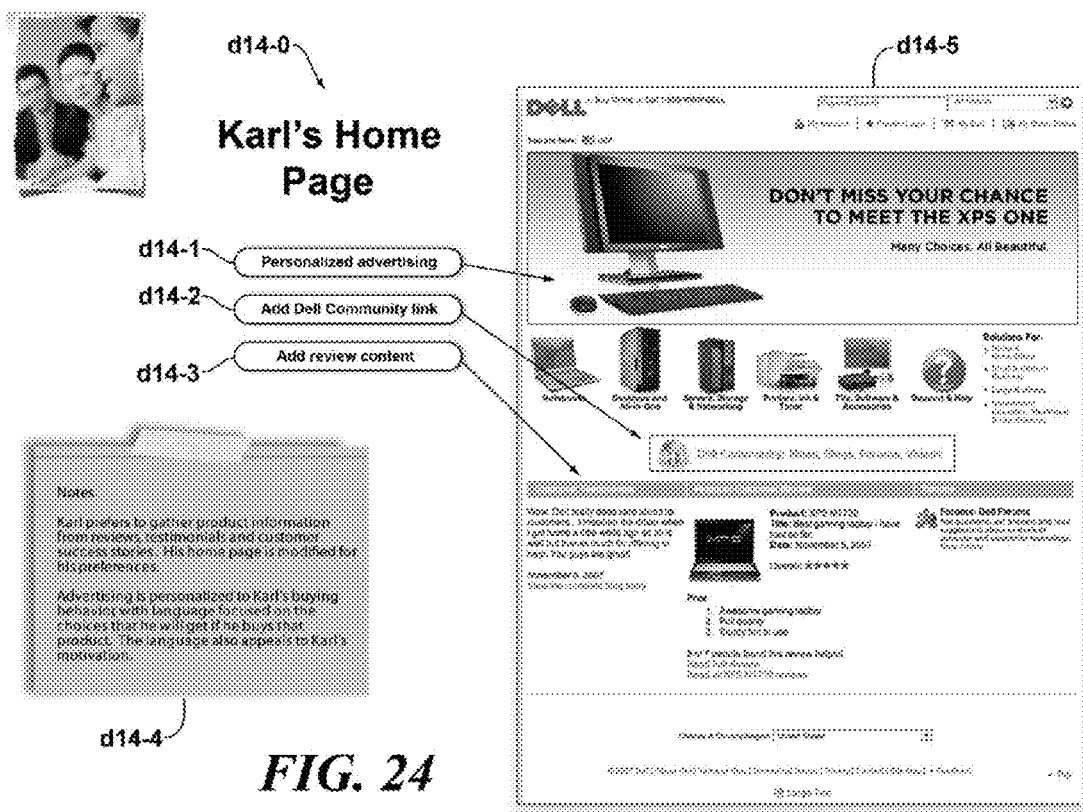
FIGS. 24 through 29 illustrate modifications to a web page in light of the portrait depicted in FIG. 17.

With reference to FIG. 24, the homepage d14-4 of the web site has been modified to reflect Karl's preference for gathering product information from reviews, testimonials and customer success stories. To that end, review content d14-3 has been added to the page, and a community link d14-2 has also been provided. Moreover, since Karl is motivated by choices, the advertising content appearing on the page has been personalized D14-1 to stress the choices that the product offers.

Figure 25:
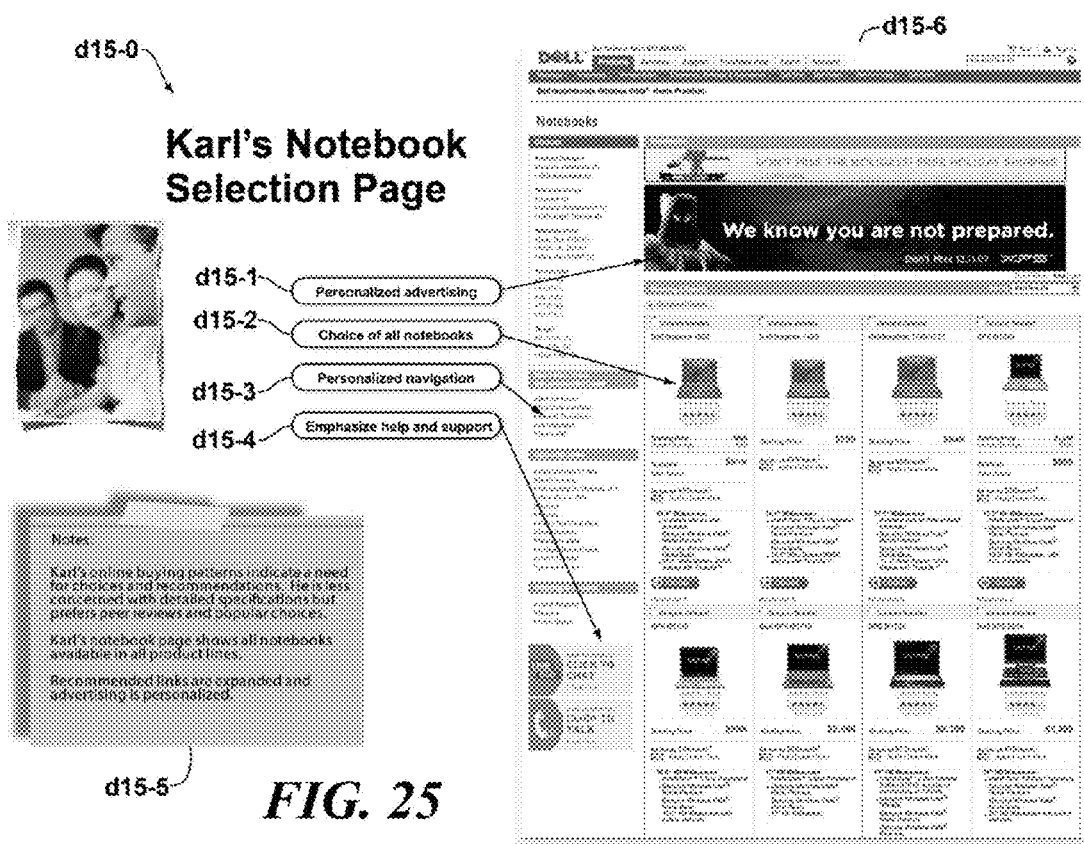

With reference to FIG. 25, which shows the notebook selection page d15-6 of the web site, Karl's online buying patterns have indicated a need for choices and recommendations. He is less concerned with detailed specifications, but prefers peer reviews and popular choices. Therefore, some of the product specification information on this page has been replaced with a listing of all notebooks available in all product lines d15-2, and the user ratings of each of these products is specified. In addition, recommended links have been expanded d15-3, and the availability of help and support has been emphasized d15-4. Advertising has also been personalized in light of Karl's behavioral portrait d15-1.

Figure 26:
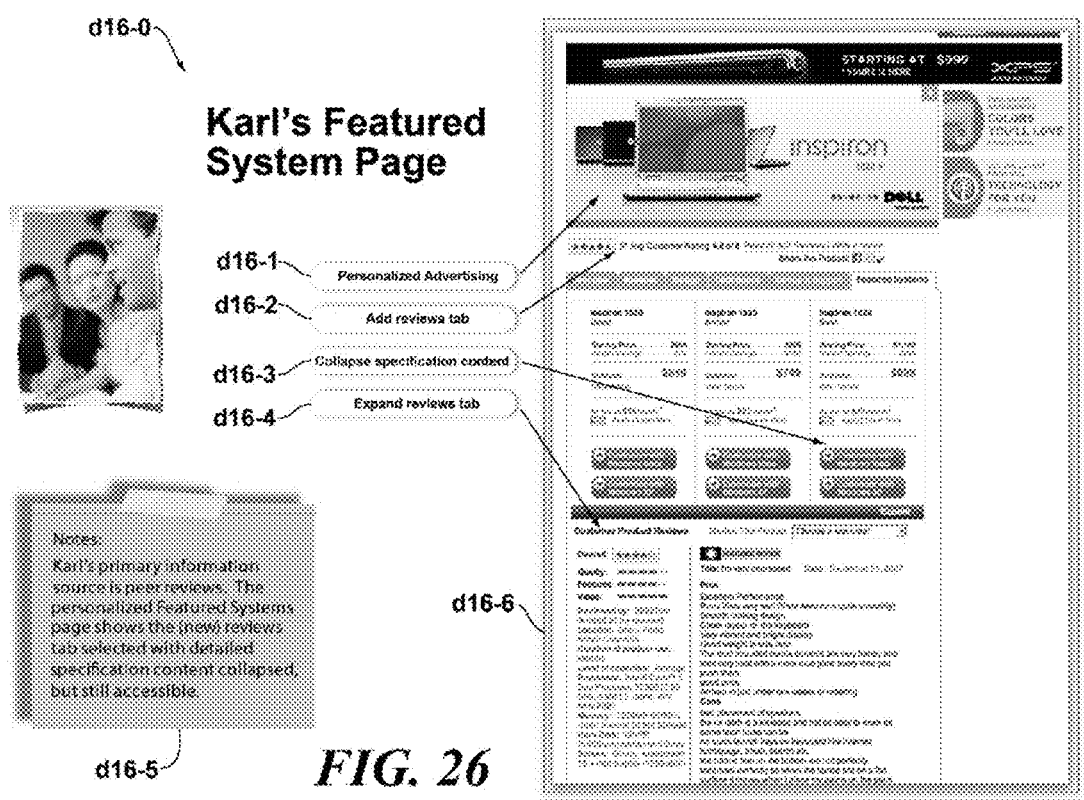

Referring now to FIG. 26, which shows the featured system page d16-6, this page of the web site has been modified to reflect the fact that Karl's primary information source is peer reviews. Consequently, the specification content has been collapsed d16-3 (though it is still accessible), and a reviews tab has been added d16-2 and expanded d16-4. The advertising appearing on the web page has again been personalized d16-1 to reflect Karl's behavioral portrait.

Figure 27:
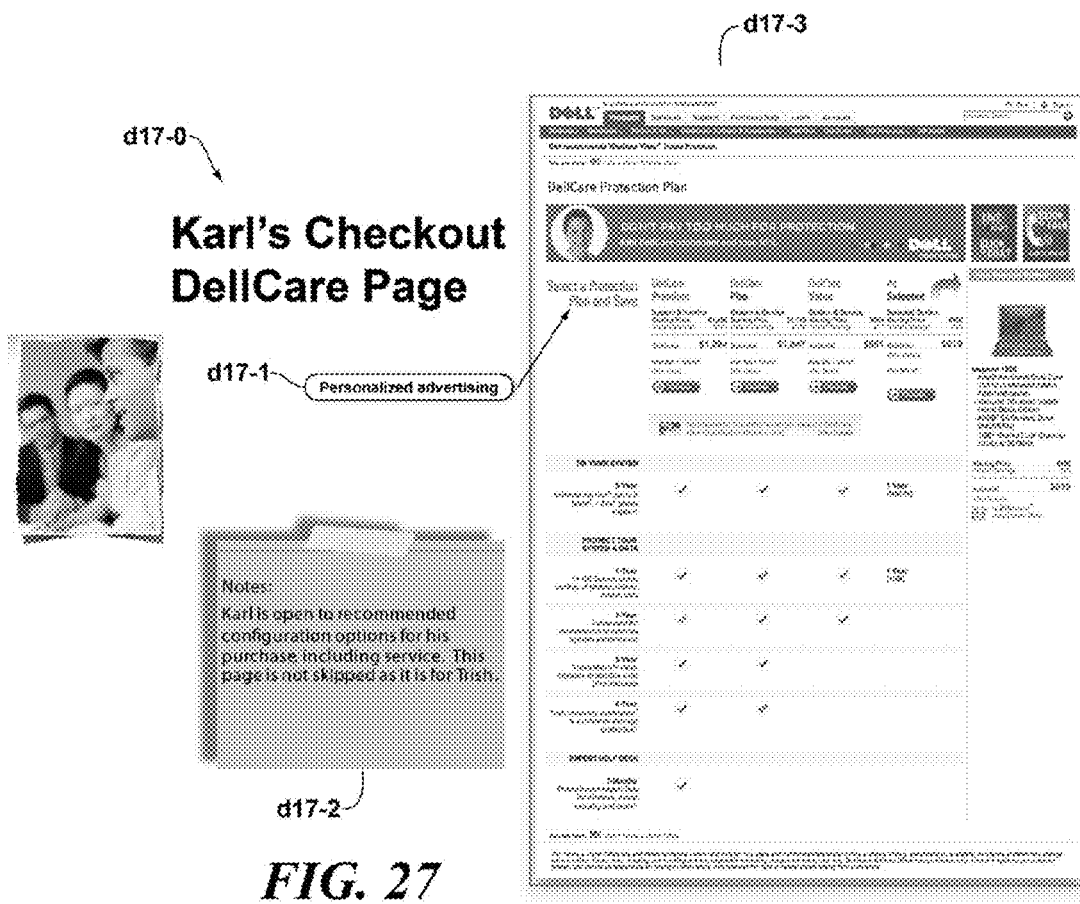

Karl's check-out page d17-3 is depicted in FIG. 27. Karl is opened to recommended configuration options for his purchase, including service options. Therefore, this page is not skipped as it was for Trish. Again, the advertising appearing on this web page has been personalized d17-1 to reflect Karl's behavioral portrait.

Figure 28:
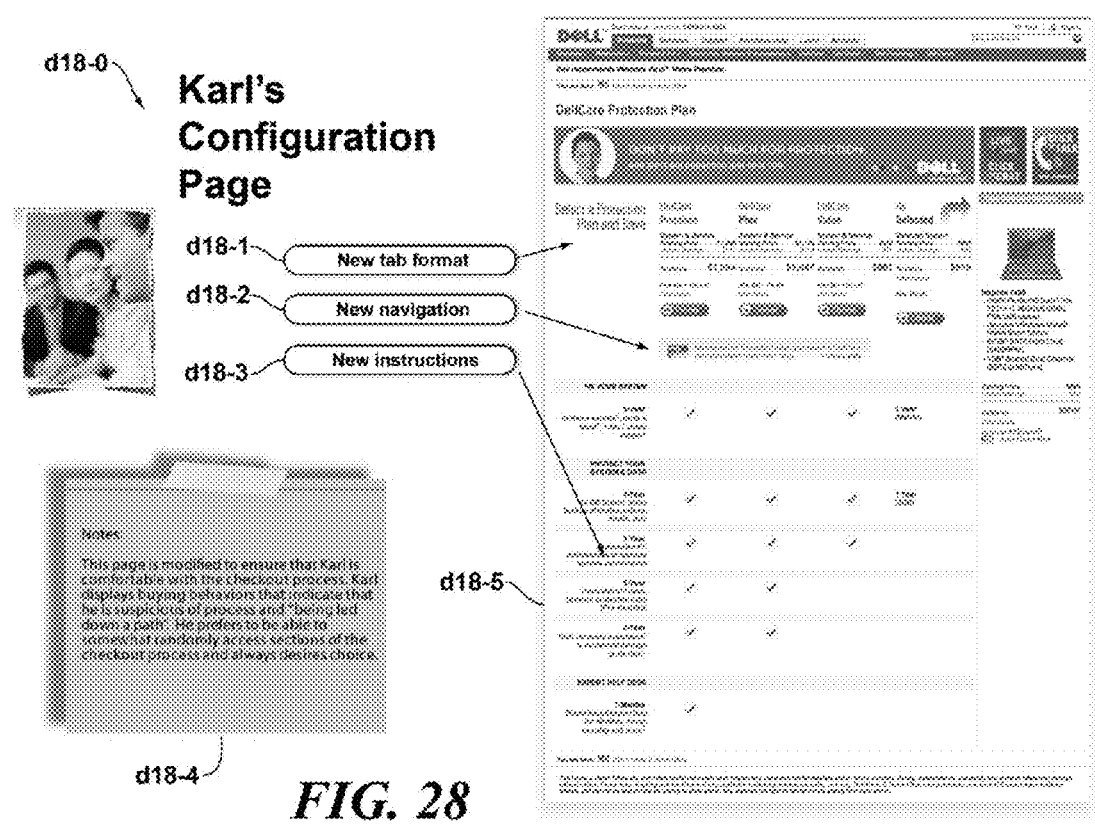

FIG. 28 depicts Karl's configuration page d18-5. Karl displays buying behaviors that indicate a suspicion of process and of being "led down a path". He prefers to be able to somewhat randomly access sections of the check-out process, and he always desires choices. Consequently, the configuration page d18-5 has been modified to ensure that Karl is comfortable with the check-out process. In particular, new tab formats d18-1, new navigation buttons d18-2, and new instructions d18-3 are provided to allow him to randomly access sections of the check-out process.

Figure 29:
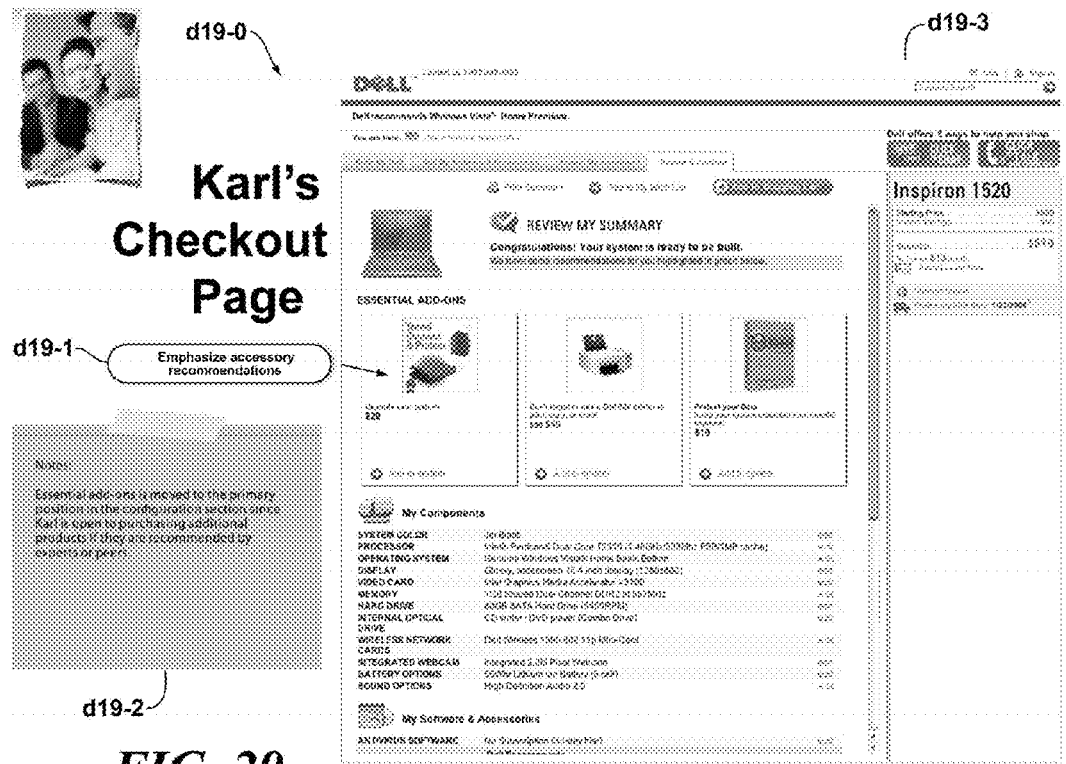
Figure 30:
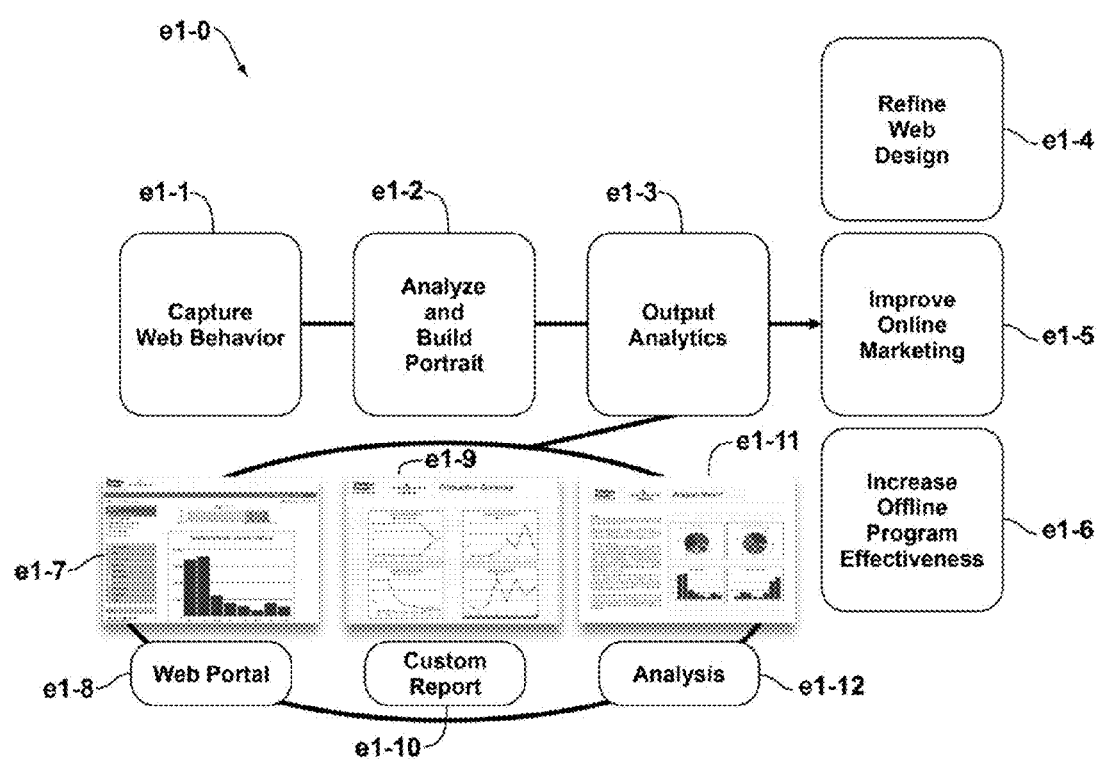
FIG. 30 is a flowchart illustrating some of the methodologies described herein which utilize output analytics derived from user behavioral portraits.
Figure 31:
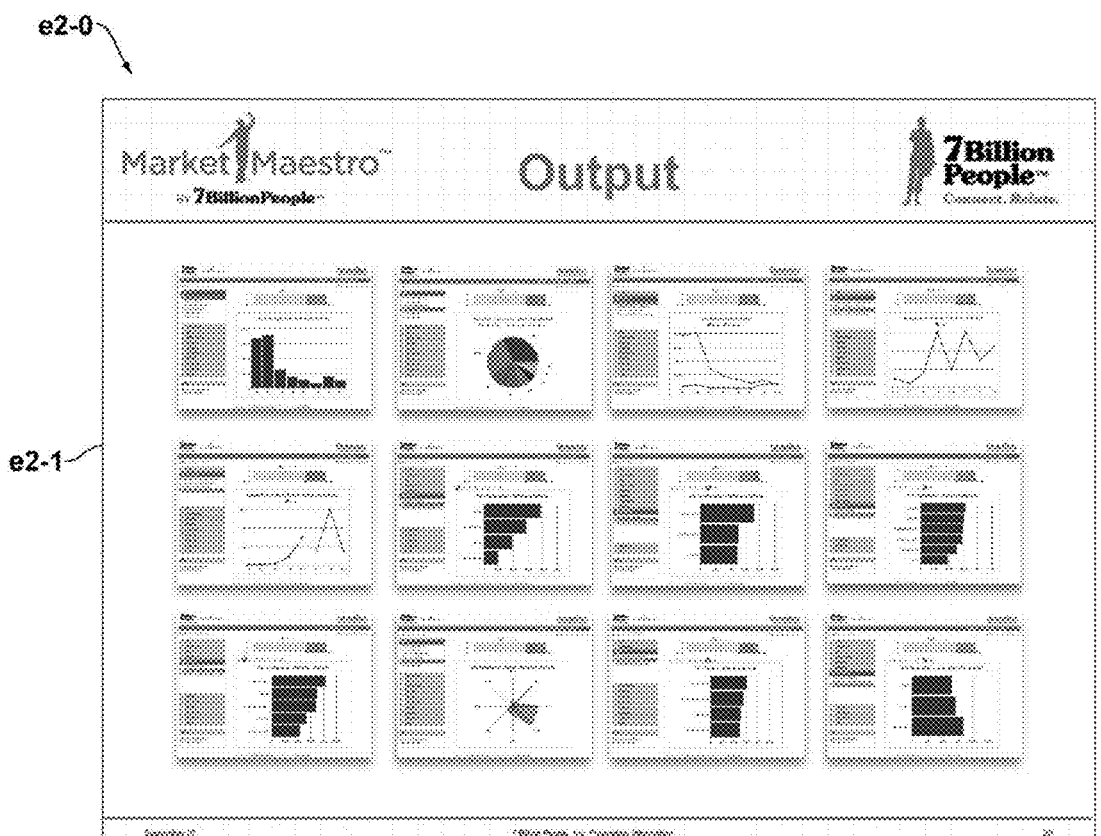
FIG. 31 is an illustration of some of the output analytics which may be obtained from the methodology depicted in FIG. 11.
Figure 32:
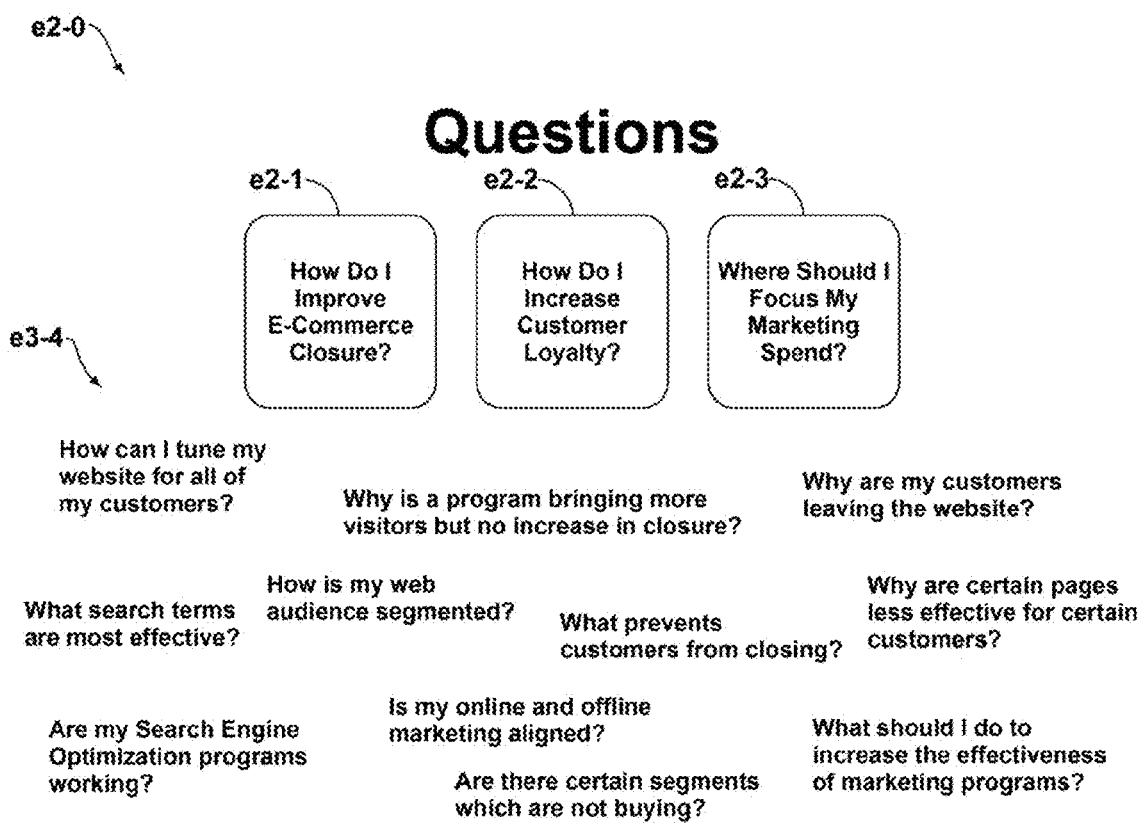
FIG. 32 is an illustration of some of the questions a website owner or online marketer may obtain answers to with the output analytics obtained from the methodology depicted in FIG. 30.

FIG. 29 depicts Karl's check-out page d19-3. Since Karl is open to purchasing additional products if they are recommended by experts or peers, the "essential add-ons" tab has been moved d19-1 to the primary position in the configuration section.

E. Web Site Analysis Based on User Behavioral Portrait

As previously noted, some of the methodologies described herein may be utilized to provide an analysis of browsing behavior on a web site as a function of behavioral portrait type. Such an analysis may help the owner of a website to improve e-commerce closure rates, to improve the rate of return visits to the website, to understand why customers (or potential customers) leave the website, to understand how to improve the effectiveness of web marketing programs and offline programs, to better align offline marketing with website content, and to understand how to best communicate with different customer segments.

EXAMPLE E1

This example illustrates the types of analytics (see FIG. 1) which may be generated on an e-commerce web site using some of the methodologies described herein.

FIGS. 31-40 represent the results of an analysis report of the type described herein which was prepared on an e-commerce web site. Such an analysis provides trends and indicators which are derived from portrait-based analytics for the website over a predetermined period of time.

Figure 33:
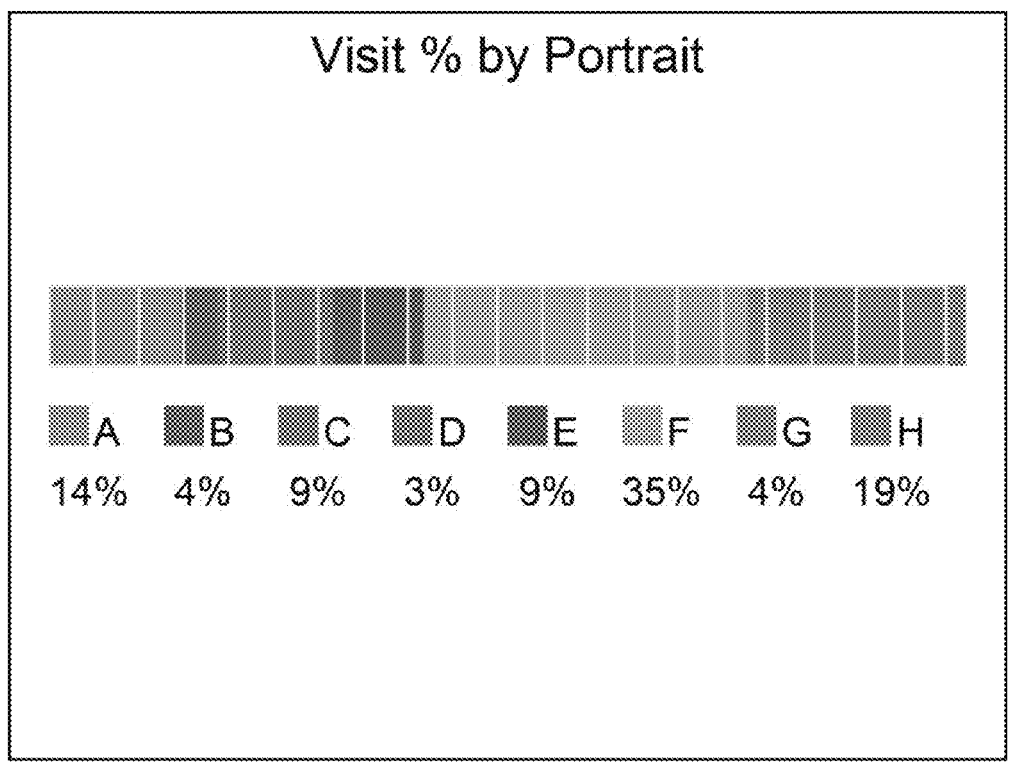
FIG. 33 is a graph showing the percentage of visits to a web site as a function of user behavioral portrait.
Figure 34:
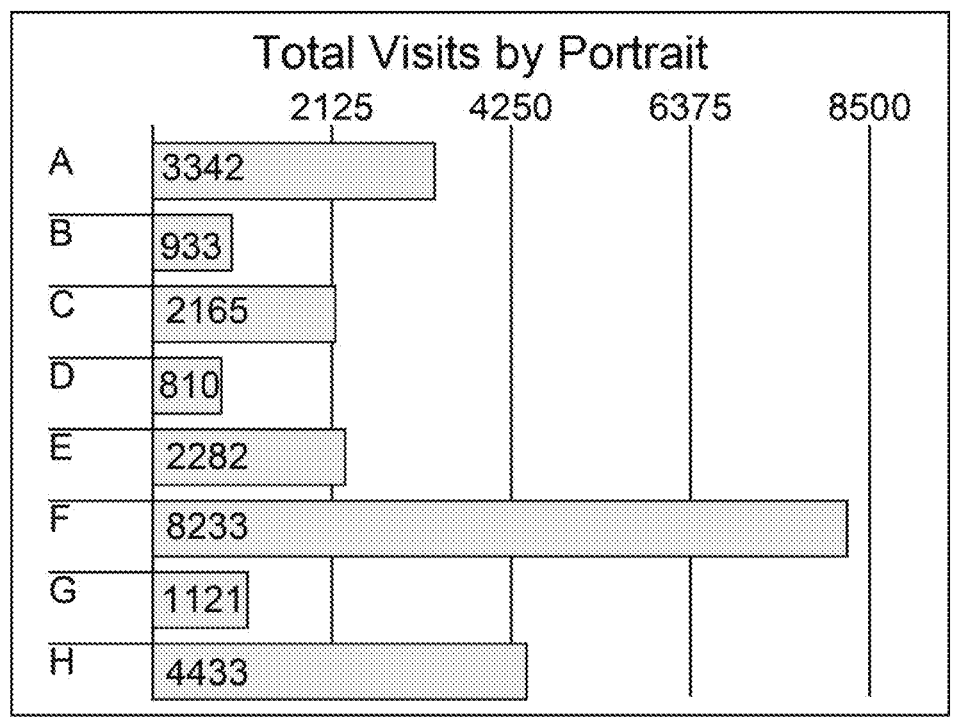
FIG. 34 is a graph showing the distribution of visits to a website as a function of user behavioral portrait.

FIGS. 33-34 depict the number of visits to the web site over a predetermined period of time, broken down in percentages by consumer behavioral portrait type (FIG. 33) and by the total number of visits by each behavioral portrait type (FIG. 34). These results demonstrate that, with respect to the particular web site under consideration, consumers having portrait types F and H showed a visit rate to the web site which was much higher than the average visit rate, while consumers having portrait types B, D, and G showed a much lower than average visit rate to the website. These results suggest that the language used in external marketing campaigns (both online and offline) is attracting consumers of portrait types F and H to the website significantly more than consumers having other portrait types. Similarly, these results suggest that the language used in the external marketing campaigns is attracting consumers with B, D and G type behavioral portraits significantly less than consumers with other behavioral portrait types. This result may be intentional, or it may be an indicator that traffic generation activities are linguistically skewed to F and H behavioral portrait types, and away from B, D, and G behavioral portrait types.

Figure 35:
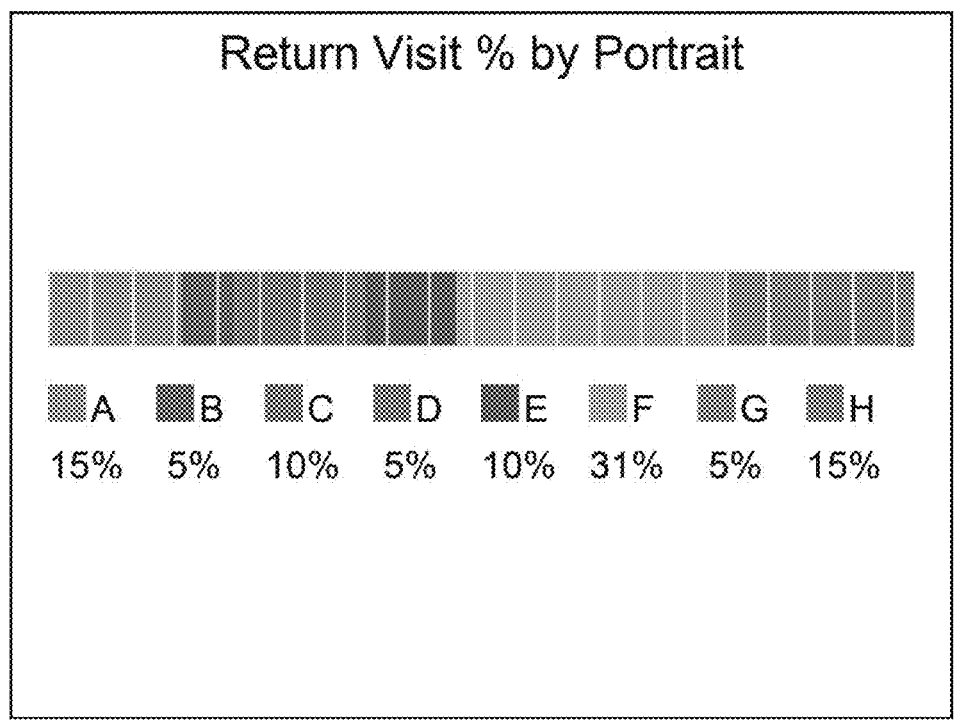
FIG. 35 is a graph showing the percentage of return visits to a web site as a function of user behavioral portrait.
Figure 36:
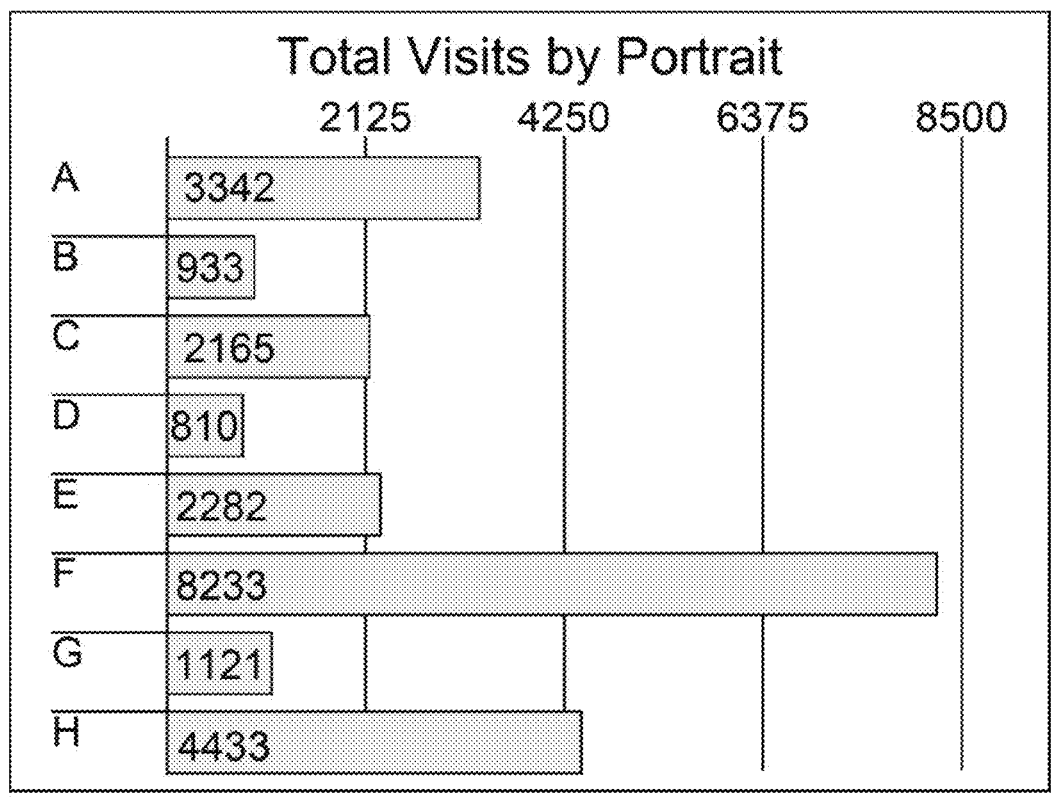
FIG. 36 is a graph showing the distribution of return visits to a website as a function of user behavioral portrait.

FIGS. 35-36 depict the number of return visits to the website over a predetermined period of time, broken down in percentages by user behavioral portrait type (FIG. 35) and by the total number of visits by each behavioral portrait type (FIG. 36). As these results illustrate, consumers having behavioral portrait types F and H are showing much greater than average return rates as compared to other behavioral portrait types. The combination of above average total visit numbers described above, and the very high return rates shown here, indicates that there is good alignment between traffic generation activities and website behavior.

As these results also illustrate, behavioral portrait types B, D, and G show a much lower than average return rate as compared to other behavioral portrait types. The combination of below average total visit numbers for these behavioral portrait types as indicated above, combined with the very low return rates indicated here, suggest an issue with website behavior not matching expectations for consumers of this behavioral portrait type.

Figure 37:
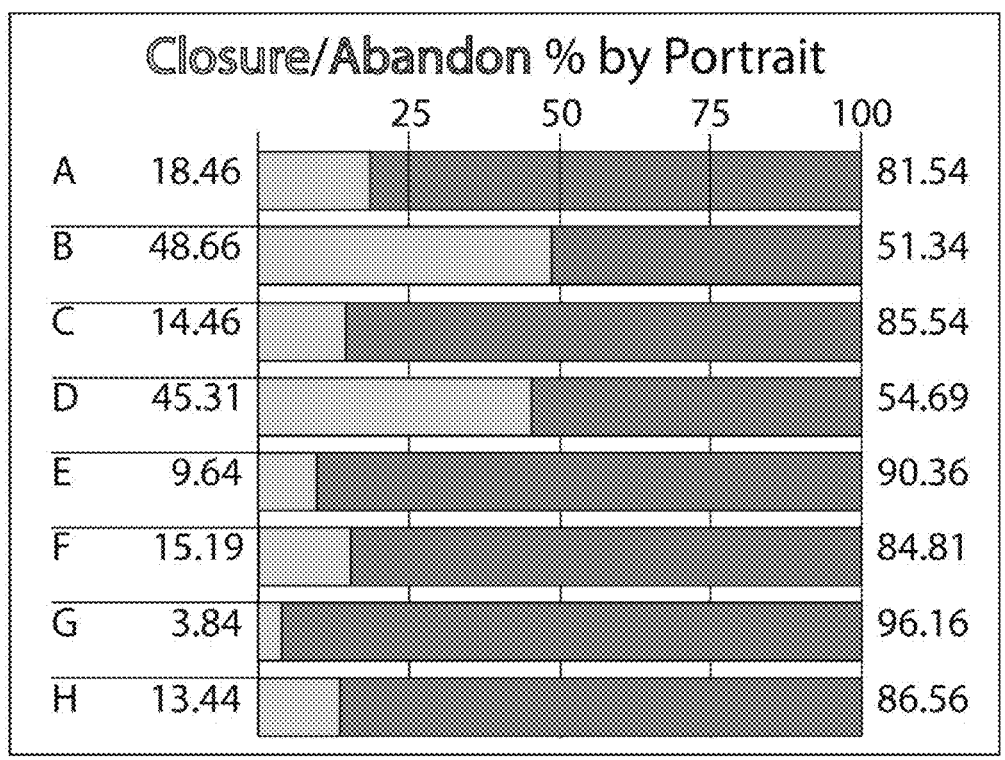
FIG. 37 is a graph showing the percentage of closures or abandonment of a web page as a function of user behavioral portrait.
Figure 38:
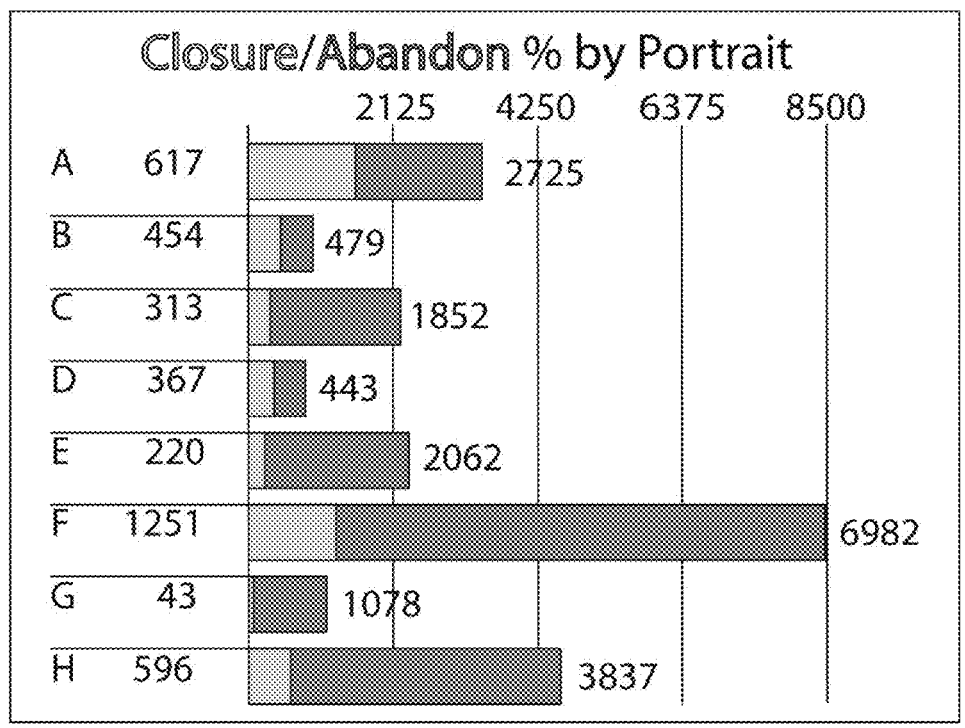
FIG. 38 is a graph showing the distribution of closures or abandonment of a web page as a function of user behavioral portrait.

FIGS. 37-38 summarize the close rates as a function of behavioral portrait type. These data suggest that consumers of behavioral portrait type H are showing below average close rates when compared other behavioral portrait types. This behavior indicates a potential issue with the check-out process for consumers of this behavioral portrait type. The high visitor rates indicate good traffic generation. High return rates imply that the website informational structure is sound. However, the low closure rate is a concern. This may be due to a misalignment of the closure process language and behavior with the rest of the web site. Thus, it would be prudent to check the top ranking abandoned pages for consumers of this behavioral portrait type to determine the key pages to be examined and tuned.

Consumers of behavioral portrait types C, E, and G are showing very low close rates on the website when compared to other behavioral portrait types. The very poor visit rates exhibited by consumers of this behavioral portrait type as compared to consumers of other behavioral portrait types strongly suggests that traffic generation for consumers of these behavioral portrait types is not working. When it does work, these visitors close less than those with other portrait types. This result may be intentional. However, if it is not, these results suggest that the abandoned pages should be checked, and the language or presentation on these pages should possibly be modified, to better align them with consumers of these behavioral portrait types.

Consumers of behavioral portrait types A and F are closing and abandoning at approximately the same rates. These indicators demonstrate very good alignment between marketing campaigns and website behavior. Nonetheless, the web site manager may wish to check the abandoned pages and program/marketing campaign statistics to determine whether further tuning can occur.

Figure 39:
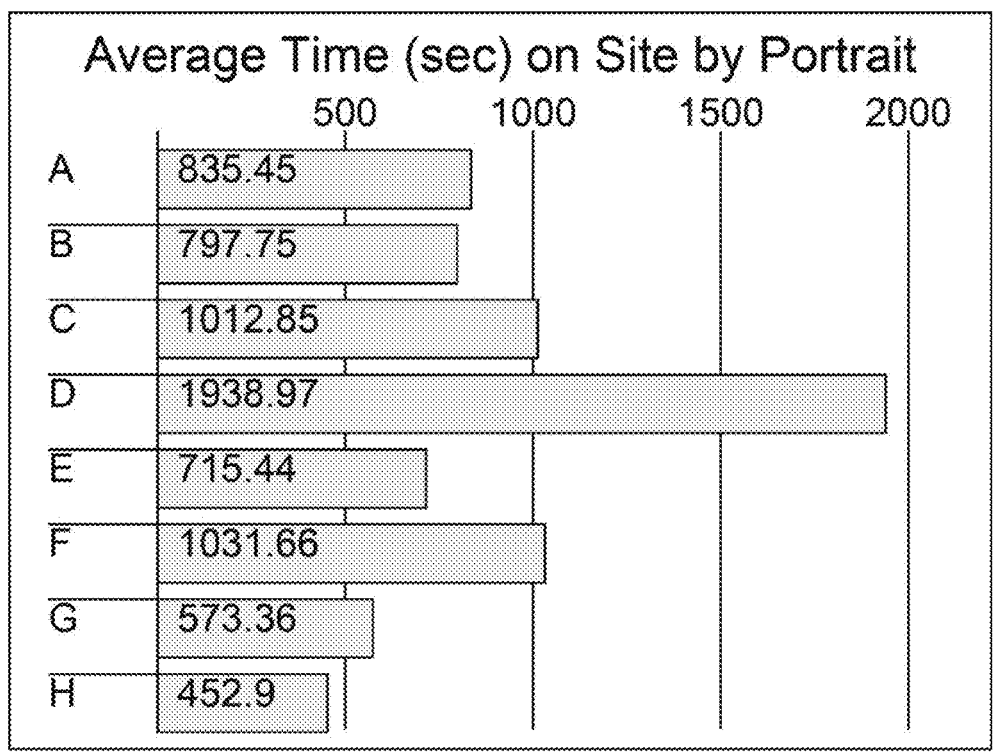
FIG. 39 is a graph showing the distribution of the average amount of time spent on a web site as a function of user behavioral portrait.

Consumers of behavioral portrait types B and D are showing very high close rates when compared to consumers of other behavioral portrait types. This result suggests a serious misalignment of traffic generation activities (online and offline marketing campaigns, pay-per-click, etc.) and the behavior and language used on the website. Consumers having these portrait types are closing at a high rate, but traffic generation programs in the outbound marketing activities in use appear to be driving these customers to the site in lower numbers as compared to consumers having other behavioral portrait types. Alignment of the language used in those marketing campaigns may drive higher levels of qualified, closing traffic to the site. The programs and advertising statistics may also be checked for further details on what is working and what is not working FIG. 39 summarizes the average time spent on the web site as a function of consumer behavioral portrait type. The results shown therein indicate that consumers of behavioral portrait types G and H are spending an average amount of time on the website. These consumers are leaving the website early in the website page hierarchy, but are spending an average time on the pages they are viewing. This may indicate that pages on the website are lengthy and informational, but are not targeted to consumers of these behavioral portrait types. Another possibility is that the website behavior does not offer a clear path to the next step or a procedure for closing on the product. This would suggest that the abandoned pages and portrait definitions should be checked for further information.

Figure 40:
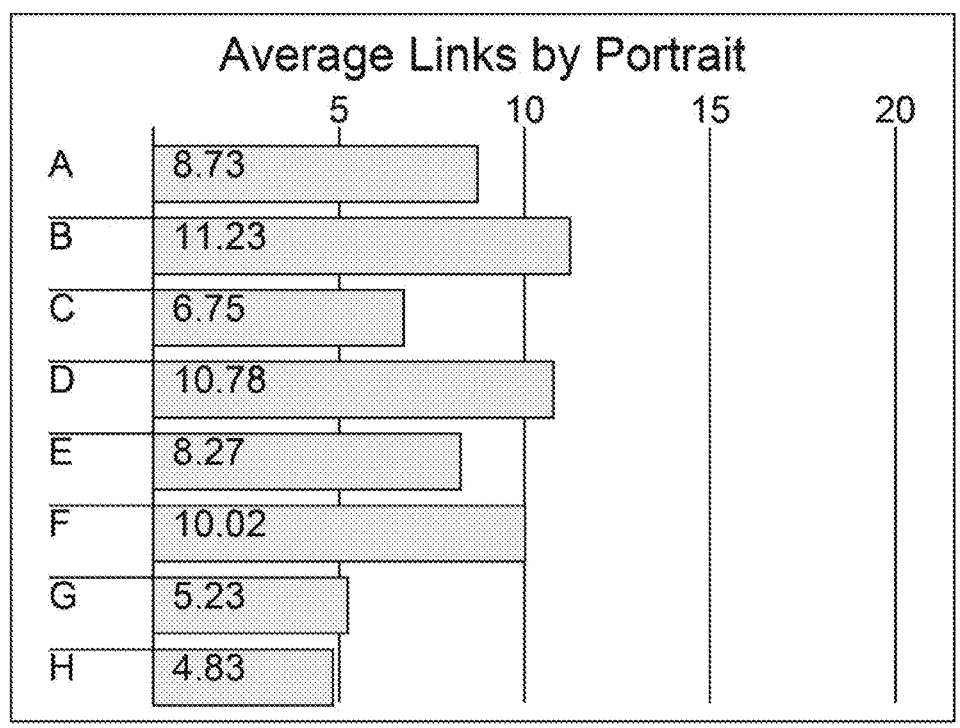
FIG. 40 is a graph showing the distribution of the average number of links selected on a web site as a function of user behavioral portrait.

FIG. 40 summarizes the link analysis for the website as a function of consumer behavioral portrait type. The results shown therein suggest that consumers of behavioral portrait types C and E are clicking through an average number of pages on the website, and yet are abandoning the website more often than not. This may be an indication that the language used in marketing and outbound programs is misaligned with website behavior. In this case, it is possible that the website demonstrates a similar flow throughout and that consumers of this behavioral portrait type abandoned the website at the first page that did not give them the information that they needed. These results suggest that the abandoned pages should be checked for more details on where these consumers are leaving. It is also possible that consumers are satisfied with the first few interactions with the web site, and then hit an area of misalignment. Again, the abandoned page details may be consulted to provide more information on this issue.

These results also show that consumers of behavioral portrait types B and D are clicking through an average number of pages on the website. Consumers having these behavioral portrait types are closing within a few clicks. This suggests that the website is organized appropriately for consumers of these portrait types, and that such consumers are finding the information that they need.

The results also demonstrate that consumers of behavioral portrait types G and H are clicking through very few pages on the website and are abandoning the website very quickly (on average, within the first few clicks). It is possible that the first few pages presented to these customers are the problem. For example, specifically ending pages from outbound programs or common entry points from pay-per-click activities may be demonstrating the suspect behavior. These results suggest checking the abandoned page details, and focusing on tuning these pages first. Another possible approach would be to test specific marketing programs with new landing pages more specifically focused on consumers of these portrait types.

In a preferred embodiment of the web site analytical software and methodologies provided herein, a knowledge base is provided which conducts real-time analysis of the behavioral data collected from web sessions. Using a set of rules or other analytical tools, the exhaustive set of data may be mined for patterns, trends, alignments, disconnects, and other observations. This analysis recognizes and identifies the complex conditions involving various combinations of the data and statistics collected by the Portrait Engine (the software module that generates user behavioral portraits; see FIG. 8). The key results can be highlighted, and a manageable set of recommendations can be made based on those results. In this way, a marketing team utilizing the report receives more actionable information, instead of an overload of data with no ability or means of identifying the critical content.

The generated report describes the web analytics and behavioral data presented in the report's graphs by pointing out the important observations marketing or e-commerce teams should notice. In the example shown above, the rules engine identifies that customers with Portrait type F have a much higher visit rate than average. However, the closure rate for Portrait type F is considerably lower than that of Portrait type B. In this particular example, the results could indicate that the outbound marketing campaign is more oriented to those customers who display the behaviors of Portrait F, while the site itself is more comfortable to customers with behaviors of Portrait type B.

F. Strategic Information for Sales Groups Based on User Behavioral Portrait

The user behavioral portraits obtainable with the systems and methodologies described herein may be utilized by various groups to enable them to communicate more efficiently with the user to whom the behavioral portrait corresponds. Such groups include, without limitation, telemarketers, call centers, sales representatives, help centers, and sales teams making face-to-face sales pitches. The information contained in the user behavioral portrait may be utilized, by itself or in combination with general analyses or recommendations for users of the general behavioral portrait type, to understand how to communicate with the user more effectively, to understand how to handle common objections the user may have, and to identify the best manner in which to close a sale with the user.

Figure 41:
FIG. 41 is an illustration of a particular, non-limiting embodiment of a customer passport which may be obtained in accordance with some of the methodologies described herein.

In the case of call centers, sales forces, or other similar teams, the portrait of the customer (or potential customer) may be used to generate a customer passport. A review of the customer passport, a non-limiting example of which is depicted in FIG. 41, may provide the employee with information about the customer's preferred approach for making decisions, their basic motivation for completing a transaction, their preferred means of receiving information, and their behavior in terms of each of the remaining attributes. Recommended language may be provided to the employee to create the highest level of comfort for the customer. Similarly, language which will create a dissonance for the customer may be identified. Furthermore, specific language recommendations may be provided to advise the employee on preferred or optimal methods for closing or re-engaging the customer, or responding to common objections the customer may have. Finally, a sample engagement script may be provided for the employee's specific company and situation.

Again, all of this information and these suggestions may be based on the customer's portrait which is dynamically generated during their web session. It will thus be appreciated that the passport allows a person using it to understand the proper language to use to describe products and services to the customer, to understand the proper way to personalize and position marketing messages for the customer, and to understand the proper way to close each customer.

Figure 42:
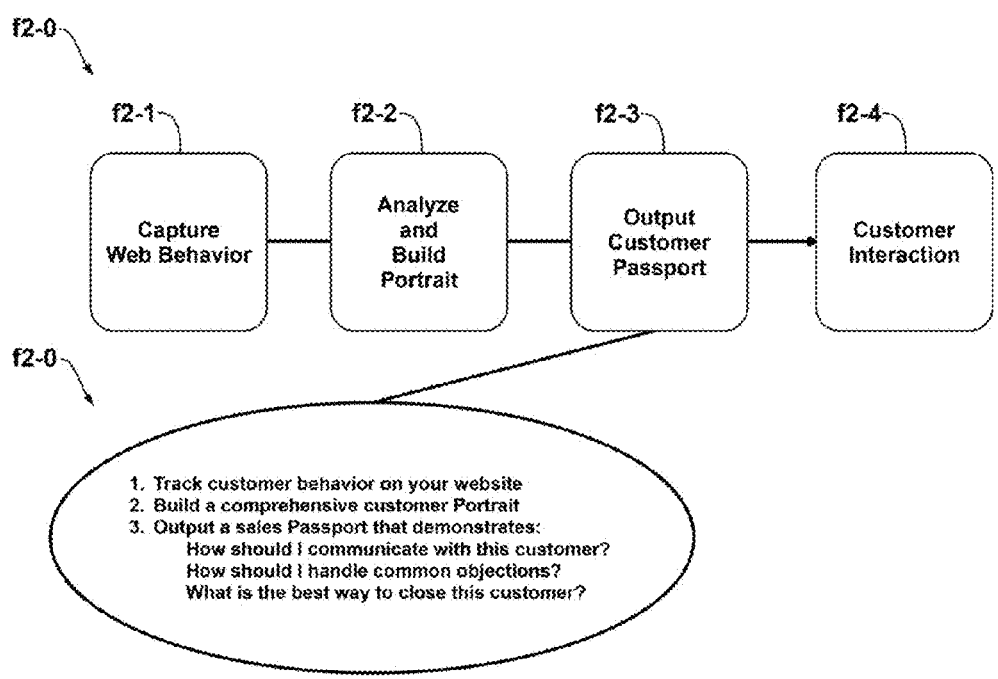
FIG. 42 is a flowchart illustrating some of the methodologies described herein which involve generation of a customer passport.

The foregoing methodology is depicted schematically in FIG. 42. As seen therein, after a user's behavior on a web site has been captured f2-1, a comprehensive customer portrait is built f2-2 based upon that behavior. This portrait is then used to generate a customer passport f2-3 which may be utilized by any of the groups described above to facilitate interaction with the customer f2-4.

G. Other Concepts and Applications

G1. General Internet Applications

While much of the foregoing discussion has dealt with web-based marketing, it will also be appreciated that the systems, methodologies and software disclosed herein are not particularly limited to that application. In particular, the systems, methodologies and software disclosed herein may be applied to a wide variety of applications where customized web pages and/or content are desirable, including, for example, gaming, nonprofit websites, and general Internet use.

As a particular, non-limiting example, methodologies of the type described herein may be utilized to provide customized web pages or web content in noncommercial applications such as government web sites. For instance, these methodologies may be utilized to provide customization of an IRS web site. Since many taxpayers consult such a site when they have questions relating to their taxes, and since some of the methodologies described herein may be utilized to ensure that information is being presented to these users in a way that is most helpful to them, the use of these methodologies may ensure that users are more likely to stay on the website longer and to find the information they are looking for. This, in turn, may reduce the burden on the IRS call center, and may also reduce the number of mistakes in subsequent tax returns.

In other embodiments, behavioral portraits for users may be derived from web sites which are unrelated to a business. Those behavioral portraits may then be utilized in the conduct of the business with respect to the individual or to the public and general.

For example, the behavior of a particular individual on a noncommercial website may be monitored, and a behavioral portrait of the individual may be derived. That behavioral portrait may then be applied to customize content on a commercial website, or may be provided to call centers or other marketing groups to help those groups understand how to interact with the individual. Such embodiments make it conducive for a business to underwrite a website which provides free content of interest to the general public, since the business may then apply the information it has learned on the nonprofit site to provide a commercial benefit (albeit indirectly) to its commercial business.

G2. Business Models

The methodologies disclosed herein may also give rise to a number of unique business models. In the current business climate, businesses are increasingly looking for methods to ensure that the products and services they purchase are not burdened with onerous up-front costs. Rather, the current trend is for products and services which demonstrate business value before payment. Consequently, a number of "pay-per-use" and "pay-per-performance" products are available today.

In the present case, some of the systems and methodologies described herein lend themselves well to a cost model that allows the customer to decide whether the product has impact as the transaction occurs. The unit of cost may be taken as the Portrait Enhanced Page (i.e., the modified web page for a particular customer during a particular web session). As the psychological behavior of the customer is tracked and weighted, the software described herein may be used to generate new web pages for that dialog. These Portrait Enhanced Pages (PEPs) may be offered to the website provider, who may either display the PEPs or opt out of doing so. If the PEP is displayed, the website provider may be charged a small fee, thus eliminating heavy up-front licensing costs and allowing the customer to determine the limit of the investment based upon business value. This model also lends itself to subscription services, where an Internet service provider may package availability of PEPs with their higher end service packages.

In other business models possible in accordance with the teachings herein, the user portraits described above may be provided to various third party entities, such as call centers, marketing teams, sales forces, and the like. Preferably, the fee for such portraits is based only on the number of portraits provided to, and accepted by, the third party entity, although various other payment options may be utilized instead. For example, the party providing the portraits may earn a commission which is calculated as a percentage of, or is otherwise based on, the value of one or more successful sales which are subsequently made by the third party entity to the user whose portrait is provided to that entity.

In some embodiments of the methodologies described herein, the provision of user portraits may be coupled with the provision of other leads relating to the users whose portraits are provided. The party providing the user portraits may be the same as, or different from, the party providing the leads. For example, the party providing the user portraits may be a search engine, and the party providing the leads may be the sponsor of one or more websites that the user has visited, or a business entity (such as, for example, a travel agency, retailer, bank or credit card company) that the user has done business with in the past. In such embodiments, the third party entity may decide whether or not to accept the portrait with the lead, and fees may be charged only when portraits are exchanged.

The resulting fees may be apportioned among the search engine and lead generation company in accordance with a contractual agreement between the organizations. If the party providing the user portraits is the same as the party providing the leads, a premium may be charged for the provision of a lead in conjunction with a portrait, as compared to the fee charged for providing only a portrait.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A system, comprising:
 a processor; and
 a memory communicatively coupled to the processor, the memory having stored therein computer-executable instructions, comprising:
   a customer portrait engine configured to:
    receive clickstream data captured in connection with input associated with an account resulting in an interaction with a website;
    develop a behavioral portrait of the account based on the clickstream data, wherein the behavioral portrait comprises a psychological profile of the account comprising respective scores for psychological attributes generated based on mapping respective actions in the clickstream data to the psychological attributes; and
    transmit a report based on the behavioral portrait to a first device associated with a first entity determined to be engaged in a communication with a second device of a second entity associated with the account, wherein the report comprises a recommendation regarding how to communicate with the second entity based on the behavioral portrait.

2. The system of claim 1, wherein the behavioral portrait includes information about a preferred manner in which to present information associated with the account.

3. The system of claim 1, wherein the behavioral portrait includes information about a preferred decision making approach associated with the account.

4. The system of claim 1, wherein the behavioral portrait includes information about a motivation for making a purchase associated with the account.

5. The system of claim 1, wherein the customer portrait engine is further configured to:
 modify web content for the website based on the behavioral portrait; and
 send the modified web content to the second device determined to be associated with the account.

6. The system of claim 1, wherein the customer portrait engine is in communication with devices via a network, and is further configured to develop respective behavioral portraits of accounts, comprising the account, associated with the devices, comprising the second device.

7. The system of claim 1, wherein the customer portrait engine is further configured to provide the second device with web pages having embedded software embedded therein, and wherein the embedded software is configured to monitor activity on the second device, capture data relating to the activity resulting in captured data, and transmit the captured data to the customer portrait engine.

8. The system of claim 1, wherein the customer portrait engine is further configured to:
 receive requests for web pages from the second device, generate modified versions of the web pages, and transmit the modified versions of the web pages to the second device, wherein the modified versions of the web pages are original versions of the web pages that have been modified in light of the behavioral portrait.

9. The system of claim 1, wherein the customer portrait engine is further configured to store the behavioral portrait in a portrait data store that stores existing behavioral portraits and further configured to generate new behavioral portraits based on additional clickstream data associated with other accounts other than the account.

10. The system of claim 9, wherein the customer portrait engine is further configured to determine whether the account already has a corresponding behavioral portrait stored in the portrait data store, and modify the existing behavioral portrait as new information about behavior associated with the account becomes available.

11. The system of claim 9, wherein the customer portrait engine repeatedly updates the behavioral portrait data store as new clickstream data associated with the account becomes available resulting an updated behavioral portrait, and serves up re-mashed content to the second device associated with the account based on the updated behavioral portrait.

12. The system of claim 1, wherein the customer portrait engine is further configured to receive and analyze user input from a server, build the behavioral portrait further based on the user input, generate a portrait enhanced web page, and provide the portrait enhanced web page to the second device associated with the account.

13. The system of claim 1, wherein the customer portrait engine is further configured to assemble and modify behavioral portraits based on behavioral data captured from a server, and wherein the system further comprises:
  a page interpreter that interprets various objects present on a web page of the website;
  a portrait enhanced page (PEP) generator which utilizes the behavioral portraits to generate PEPs; and
  a PEP data store configured to store the PEPs.

14. The system of claim 1, wherein the customer portrait engine is configured to be injected into the website using JavaScript snippets placed in web page templates and further configured to capture the clickstream data.

15. The system of claim 14, wherein the JavaScript is configured to send the clickstream data to the customer portrait engine.

16. A method, comprising:
  receiving, by a system including a processor, input associated with an account, wherein the input is associated with an interaction with at least one web page;
  creating, by the system, a behavioral portrait of the account based on the input, wherein the behavioral portrait comprises a psychological profile of the account comprising respective scores for psychological attributes generated based on mapping respective actions in the clickstream data to the psychological attributes; and
  transmitting, by the system, a report based on the behavioral portrait to a first device associated with a first entity engaged in a communication with a second device of a second entity associated with the account, wherein the report comprises a recommendation for how to communicate with the second entity via the second device based on the behavioral portrait.

17. The method of claim 16, wherein the behavioral portrait pertains to at least one of a preferred decision-making approach associated with the account, a motivation for making a purchase associated with the account, or a preferred manner in which to have information presented when determined to be a presentation in association with the account.

18. The method of claim 16, wherein the behavioral portrait is stored in a behavioral portrait data store.

19. The method of claim 16, wherein the input includes at least one of mouse clicks or data field entries.

20. The method of claim 16, wherein the recommendation comprises a sample engagement script.

21. The method of claim 16, wherein the recommendation comprises specific language for responding to a defined objection.

22. The method of claim 16, wherein the recommendation comprises identifies language that will create dissonance for the second entity.

23. The method of claim 16, wherein the recommendation comprises identifies a preferred approach of the second entity in making a decision.

24. The method of claim 16, wherein the recommendation comprises identifies a motivation of the second entity for completing a transaction.

25. The method of claim 16, wherein the creating the behavioral portrait is based solely on the input.

26. The method of claim 16, further comprising categorizing selectable items on the at least one web page into categories, and mapping the categories to the psychological attributes.

27. The method of claim 26, further comprising using a set of rules to assign a weight to a psychological attribute, of the psychological attributes, in the behavioral portrait in response to an order in which the selectable items were selected as represented by the input.

28. The method of claim 26, further comprising using a set of rules to assign a weight to a psychological attribute, of the psychological attributes, in the behavioral portrait in response to a selection as represented by the input of a selectable item in one of the categories.

29. A non-transitory computer readable storage device storing instructions that, in response to execution, cause a system comprising a processor to perform operations, comprising:
  receiving clickstream data captured in association with input relating to an account resulting in an interaction with a website; and
  developing a behavioral portrait of an identity associated with the account based on the clickstream data, wherein the behavioral portrait is a psychological profile associated with the identity comprising respective scores for psychological attributes generated based on mapping respective actions in the clickstream data to the psychological attributes; and
  transmitting a customer passport based on the behavioral portrait to a first device associated with a first entity engaged in a communication with a second entity associated with the account via a second device, wherein the customer passport comprises at least one recommendation with an instruction of how to communicate with the second entity based on the behavioral portrait.

30. The non-transitory computer readable storage device of claim 29, wherein the recommendation comprises specific language for responding to a defined objection.

* * * * *